(12) United States Patent
Toriyama et al.

(10) Patent No.: US 6,218,804 B1
(45) Date of Patent: Apr. 17, 2001

(54) VEHICLE INCLUDING ENGINE STOPPING/STARTING CONTROL UNIT

(75) Inventors: Masayuki Toriyama; Tomokazu Sakamoto; Satoshi Honda; Toru Iwadate; Masahide Yokoo; Hiroyuki Nakajima; Takeshi Yanagisawa, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/472,976

(22) Filed: Dec. 28, 1999

(30) Foreign Application Priority Data

Dec. 28, 1998 (JP) .................................................. 10-372085
Jan. 14, 1999 (JP) .................................................. 11-007700

(51) Int. Cl.$^7$ ....................................................... H02J 7/00
(52) U.S. Cl. ..................... 320/104; 320/125; 320/160; 180/65.1; 180/65.3; 123/198 R
(58) Field of Search ................................. 320/104, 125, 320/160; 180/65.1, 65.3, 65.4, 65.8; 123/198 R

(56) References Cited

U.S. PATENT DOCUMENTS 3,904,948 * 9/1975 Earle .......................................... 322/7
4,687,983 * 8/1987 Beyn ......................................... 322/28
5,080,059 * 1/1992 Yoshida et al. ................... 123/198 R
6,037,749 * 3/2000 Parsonage ............................. 320/132

FOREIGN PATENT DOCUMENTS 58-179134   10/1983   (JP) .
63-75323     5/1988   (JP) .

* cited by examiner

Primary Examiner—Peter S. Wong
Assistant Examiner—Gregory J. Toatley, Jr.
(74) Attorney, Agent, or Firm—Birch, Stewart, Kolasch & Birch, LLP

(57) ABSTRACT

An engine stopping/starting control unit having improved accelerating performance. A charging limiting device is provided which limits the charge provided to a generator when the vehicle is stopped. The decreased charging allows for better performance when the vehicle accelerates from a stopped states. Also, the vehicle headlight can be dimmed while the vehicle is stopped, which reduces the load on the generator. An acceleration detector detects when the vehicle accelerates during running, and can decrease the generator load in response to the acceleration.

18 Claims, 20 Drawing Sheets

| | STARTING MODE | IDLE SW MODE | ENGINE - STARTING/VEHICLE - MOVING MODE | |
|---|---|---|---|---|
| | | | FIRST PATTERN | SECOND PATTERN |
| ON/OFF CONTROL OF STARTER RELAY | • STARTER SW IS TURNED ON<br>• STOP SW IS TURNED ON → AND – ON<br>• Ne IS IDLE OR LESS | DITTO TO THE LEFT | • THROTTLE SW IS TURNED ON<br>• SEATING SW IS TURNED ON → AND – ON<br>• Ne IS IDLE OR LESS | • STARTER SW IS TURNED ON<br>• STOP SW IS TURNED ON → AND<br>• Ne IS IDLE OR LESS ＿＿＿ OR – ON<br>• THROTTLE SW IS TURNED ON<br>• SEATING SW IS TURNED ON → AND<br>• Ne IS IDLE OR LESS |
| ON/OFF CONTROL OF BY - STARTER RELAY | Ne IS SPECIFIC ROTATIONAL NUMBER OR MORE    ON | DITTO TO THE LEFT | DITTO TO THE LEFT | DITTO TO THE LEFT |
| CONTROL OF STAND - BY INDICATOR | USUALLY OFF | USUALLY OFF | • SEATING SW IS TURNED ON<br>• Ne IS SPECIFIC ROTATIONAL → AND – ON<br>NUMBER OR LESS | USUALLY OFF |
| IGNITION CONTROL | USUALLY ON | USUALLY ON | • THROTTLE SW IS TURNED ON<br>• VEHICULAR SPEED IS → OR – ON<br>LARGER THAN 0 KM | USUALLY ON |
| CONTROL OF HEAD LAMP | • Ne IS SPECIFIC ROTATIONAL<br>NUMBER OR MORE → OR – ON<br>(LESS THAN IDLE)<br>• VEHICULAR SPEED IS<br>LARGER THAN 0 KM | USUALLY ON | USUALLY ON | USUALLY ON |

Fig. 9

CONDITION (1): MAIN SW IN OFF STATE IS TURNED ON

AND

IDLE SW IS TURNED OFF

CONDITION (2): SPECIFIC VEHICULAR SPEED OR MORE IS

CONTINUED FOR SPECIFIC TIME OR MORE

CONDITION (3): IGNITION OFF IS CONTINUED FOR 3 MIN

OR MORE

CONDITION (4): IDLE SW IN OFF STATE IS TURNED ON

CONDITION (5): IDLE SW IN ON STATE IS TURNED OFF

CONDITION (6): IDLE SW IS TURNED ON

AND

MAIN SW IN OFF STATE IS TURNED ON

| | STARTING MODE | IDLE SW MODE | ENGINE - STARTING/VEHICLE - MOVING MODE | |
|---|---|---|---|---|
| | | | FIRST PATTERN | SECOND PATTERN |
| ON/OFF CONTROL OF STARTER RELAY | • STARTER SW IS TURNED ON<br>• STOP SW IS TURNED ON<br>• Ne IS IDLE OR LESS | DITTO TO THE LEFT | • THROTTLE SW IS TURNED ON<br>• SEATING SW IS TURNED ON<br>• Ne IS IDLE OR LESS | • STARTER SW IS TURNED ON<br>• STOP SW IS TURNED ON<br>• Ne IS IDLE OR LESS —AND—<br>• THROTTLE SW IS TURNED ON<br>• SEATING SW IS TURNED ON —AND— —OR— ON<br>• Ne IS IDLE OR LESS |
| ON/OFF CONTROL OF BY - STARTER RELAY | Ne IS SPECIFIC ROTATIONAL NUMBER OR MORE  ON | DITTO TO THE LEFT | DITTO TO THE LEFT | DITTO TO THE LEFT |
| CONTROL OF STAND - BY INDICATOR | USUALLY OFF | USUALLY OFF | • SEATING SW IS TURNED ON —AND— OFF<br>• Ne IS SPECIFIC ROTATIONAL NUMBER OR LESS | USUALLY OFF |
| IGNITION CONTROL | USUALLY ON | USUALLY ON | • THROTTLE SW IS TURNED ON —OR— ON<br>• VEHICULAR SPEED IS LARGER THAN 0 KM | USUALLY ON |
| CONTROL OF HEAD LAMP | • Ne IS SPECIFIC ROTATIONAL NUMBER OR MORE (LESS THAN IDLE) —OR— ON<br>• VEHICULAR SPEED IS LARGER THAN 0 KM | USUALLY ON | • IGNITION CONTROL IS TURNED ON<br>• IGNITION CONTROL IS TURNED OFF   CHOPPING CONTROL | USUALLY ON |

Fig. 22

VEHICLE INCLUDING ENGINE STOPPING/STARTING CONTROL UNIT

BACKGROUND OF THE INVENTION

1. Field of the Invention

The present invention relates to a vehicle including an engine stopping/starting control unit for interrupting, during running, ignition control of an engine under a specific vehicle stopping condition, and re-starting, after interruption, the ignition control of the engine in response to a specific vehicle moving operation. Particularly, an engine stopping/starting control unit is disclosed with improved accelerating performance upon vehicle movement.

2. Background Art

An engine stopping/starting control unit intended to suppress the emission of exhaust gas, particularly upon idling, and fuel consumption, has been disclosed. One such unit is disclosed in Japanese patent Laid-open No. Sho 63-75323. In this patent, the control unit performs such that when a vehicle is stopped, the engine is automatically stopped, and when a throttle grip is operated to move the vehicle, the engine is automatically restarted to move the vehicle.

In a light vehicle, such as a motorcycle or a three-wheeled vehicle, it may be desirable to use a head lamp in the daytime as well as in the nighttime. This can cause problems when the light vehicle moves from the stopped position. Because activation of the head lamp increases the power requirement from the generator, the required driving torque of the generator is correspondingly increased. As a result, the vehicle in which the head lamp is left on has an increased mechanical load on the engine. This negatively affects accelerating performance.

To solve the above problem, a technique has been disclosed in Japanese Patent Laid-open No. Sho 58-179134, in which the power generation amount of a generator is lowered upon rapid acceleration in order to reduce the load on the engine, thereby ensuring sufficient accelerating performance.

For a light vehicle such as a motorcycle or a three-wheeled vehicle, it may also be desirable to keep the head lamp on for improved visibility to the opposite lane during running and upon vehicle stop, such as at a stoplight.

For the vehicle including the engine stopping/starting control unit, however, since the engine is automatically stopped upon vehicle stop, if the head lamp is left on, a discharge of the battery rapidly proceeds. As a result, upon vehicle movement after automatic stoppage, the power generation amount of the generator is increased, so that the load of the engine is correspondingly increased, thereby reducing accelerating performance.

As described above, for the vehicle including the engine stopping/starting control unit in which the head lamp is left on upon vehicle stop, there arises the problem that sufficient accelerating performance cannot be obtained upon rapid acceleration during running and upon vehicle movement after automatic stoppage of the engine.

SUMMARY OF THE INVENTION

The present invention addresses the problems associated with the conventional art and obtains other advantages not contemplated by the conventional art.

The present invention includes an engine stopping/starting control unit in which a head lamp is left on during vehicle stop, and in which a desirable accelerating performance is obtained even upon vehicle movement after automatic engine stoppage.

To achieve the above object, a vehicle includes an engine stopping/starting control unit for interrupting, during running, ignition control of the engine under a specific vehicle stopping condition, and, restarting, after interruption, the ignition control of the engine in response to a specific vehicle moving operation. The vehicle includes the following desirable characteristics:

(1) the engine stopping/starting control unit includes: a vehicle moving operation detector for detecting a vehicle moving operation, and a charging limiting device for limiting charging from a generator into a battery for a specific period of time if it detects the vehicle moving operation;

(2) the engine stopping/starting control unit further includes an acceleration detector for detecting an acceleration performed by a driver during running, and the charging limiting device limits the charging from the generator into the battery for the specific period of time if acceleration or vehicle movement is detected by either the acceleration detector or the vehicle moving operation detector;

(3) the engine stopping/starting control unit further includes a regulator for controlling the voltage outputted from the generator to a charging voltage and supplying the charging voltage to the battery, and the charging limiting device limits the charging by reducing the charging voltage of the regulator; and (4) the engine stopping/starting control unit further includes a switch for controlling the supply of power to a head lamp of the vehicle, and a head lamp control device for controlling opening/closing of the switch. When the ignition control of the engine is interrupted, the head lamp control device interrupts the switch to substantially reduce the voltage applied to the head lamp.

According to feature (1), when the vehicle moving operation is detected, the charging from the generator to the battery is limited to reduce the electrical load of the generator. Accordingly, since the torque required for the engine to drive the generator is reduced, the accelerating performance is improved. Also, because the charging from the generator to the battery, upon vehicle movement from vehicle stop, is not interrupted but only limited, the head lamp does not become dark upon vehicle movement from vehicle stop.

According to the feature (2), the accelerating performance can be improved not only upon vehicle movement from vehicle stop, but also acceleration during running.

According to the feature (3), the charging limitation upon vehicle movement after vehicle stop, or upon acceleration, can be simply performed by control of a voltage of the regulator.

According to the feature (4), when the ignition control of the engine is interrupted upon vehicle stop and the engine is automatically stopped, the voltage applied to the head lamp is substantially reduced. Accordingly, the discharge of the battery can be suppressed without turning the head lamp off. As a result, since the amount of charging from the generator to the battery can be reduced upon the subsequent vehicle movement, the electrical load of the generator is reduced. This improves the accelerating performance upon vehicle movement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
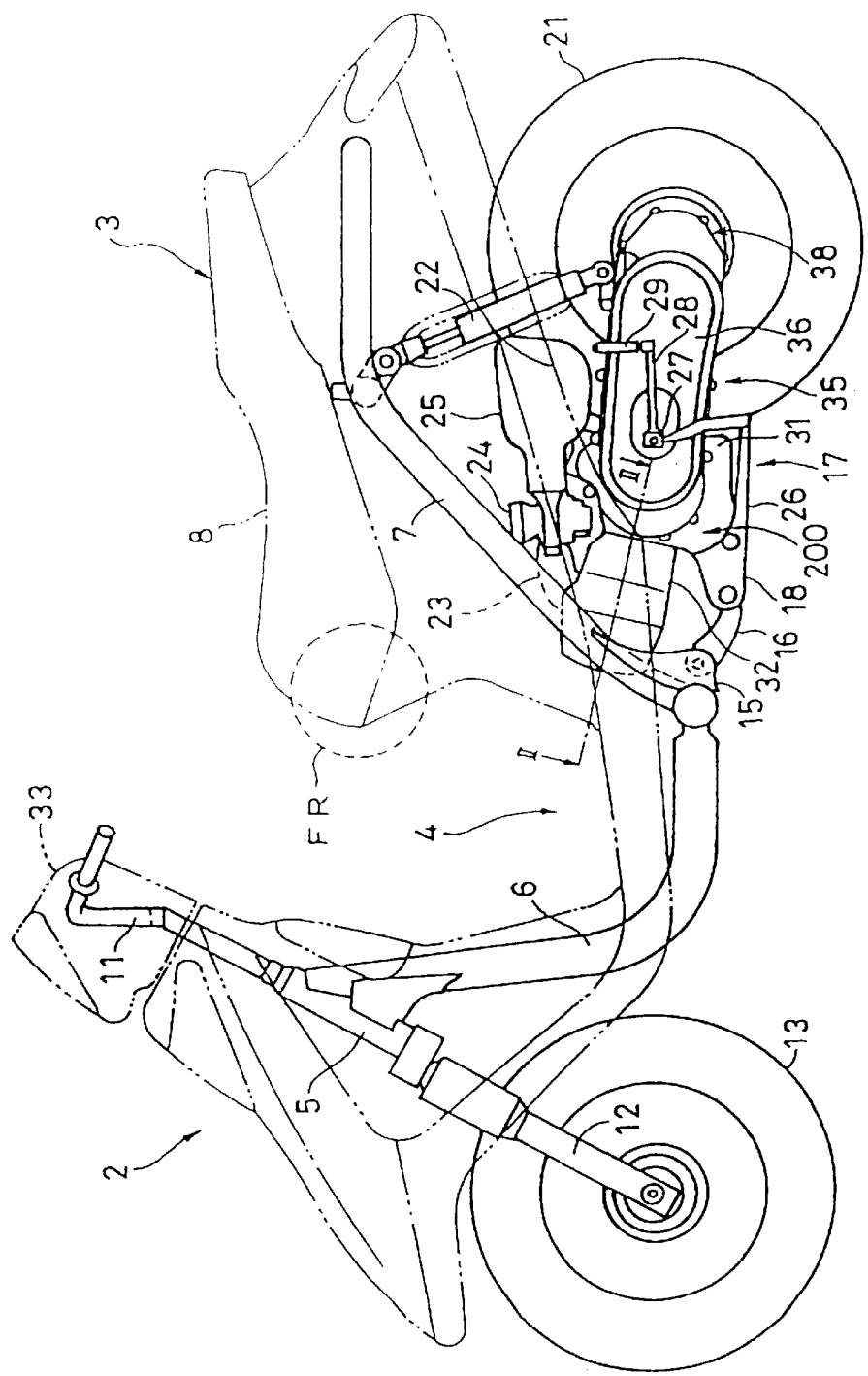
FIG. 1 is a side view showing a scooter-type motorcycle on which an engine stopping/starting control system according to the present invention is mounted.

FIG. 1 is a side view of a scooter-type motorcycle 1. A body front 2 is connected to a body rear 3 via a low floor 4. A body frame, which constitutes the skeletal structure of a vehicular body, basically includes a down tube 6 and a main pipe 7. A fuel tank and a containing box (both not shown) are supported by the main pipe 7, and a seat 8 is disposed over the fuel tank and the containing box. The seat 8 serves as a luggage box provided on the underside of the seat 8, and is configured to be turnable by a hinge mechanism provided on a front portion FR of the seat 8 for opening/closing the luggage box.

At the body front 2, a handlebar 11 is rotatably supported by a steering head 5 so as to extend upwardly therefrom, and a front fork 12 is also rotatably supported by the steering head 5 so as to extend downwardly therefrom. A front wheel 13 is rotatably supported by the lower end of the front fork 12. The upper portion of the handlebar 11 is covered with a handle cover 33 serving as an instrument board. A bracket 15 projects from the lower end of a rising portion of the main pipe 7, and a swing unit 17 is swingably connected to and supported by the bracket 15 via a link member 16.

A single-cylinder/two-stroke internal combustion engine 200 is mounted on the front portion of the swing unit 17. A belt-type continuously variable transmission 35 extends rearwardly from the internal combustion engine 200. A reduction mechanism 38 is provided on the rear portion of the belt-type continuously variable transmission 35 via a centrifugal clutch, and a rear wheel 21 is rotatably supported by the reduction mechanism 38. A rear cushion 22 is interposed between the upper end of the reduction mechanism 38 and an upper curved portion of the main pipe 7. A carburetor 24 is connected to an intake pipe 23 and extends from a cylinder 32 of the internal combustion engine 200. An air cleaner 25 is connected to the carburetor 24 and is disposed on the front portion of the swing unit 17.

A main stand 26 is pivotably mounted on a hanger bracket 18 projecting from the lower portion of a unit swing case 31. The base end of a kick arm 28 is fixed on a kick shaft 27 projecting from a transmission case cover 36 of the belt-type continuously variable transmission 35, and a kick pedal 29 is provided at the leading end of the kick arm 28.

Figure 2:
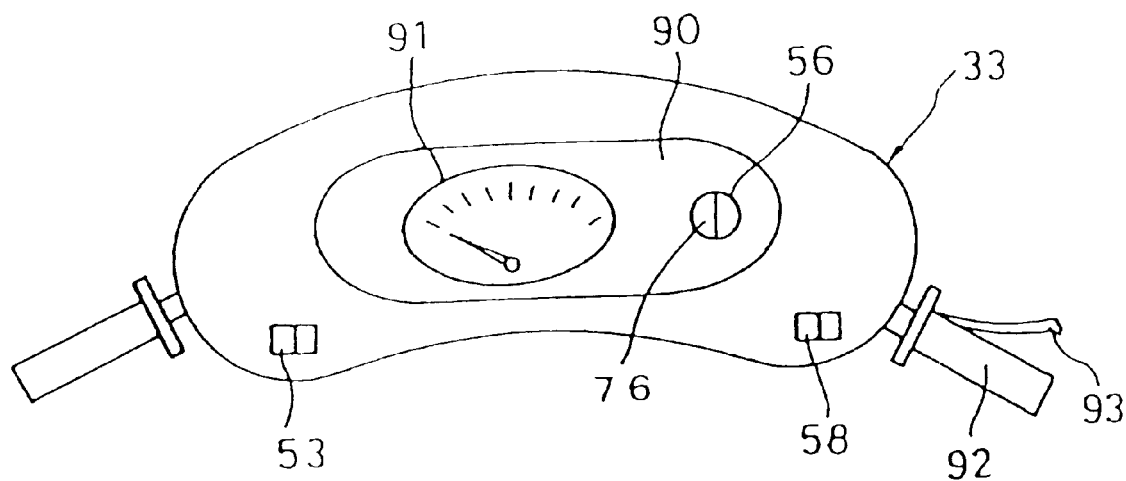
FIG. 2 is a plan view of an instrument panel on a scooter-type motorcycle.

FIG. 2 is a plan view of the instrument panel of the scooter-type motorcycle 1. The instrument panel 90 provided on the handle cover 33 includes a speedometer 91, a stand-by indicator 56, and a battery indicator 76. As will be described in detail later, the stand-by indicator 56 flashes upon engine stop under engine stopping/starting control, to warn the driver that if a throttle is opened, the engine is immediately started, thereby allowing movement of the vehicle. The battery indicator 76 flashes if the battery voltage is lowered to a specified value, to warn the driver of a shortage of the charged amount of power in the battery.

The handle cover 33 is provided with an idle switch 53 for permitting or limiting idling, and a starter switch 58 for starting a starter motor. The right end portion of the handlebar 11 has a throttle grip 92 and a brake lever 93. In addition, a root portion of each of the right and left throttle grips includes a horn switch, a blinker switch, and the like as in a conventional motorcycle (not shown).

Figure 3A:
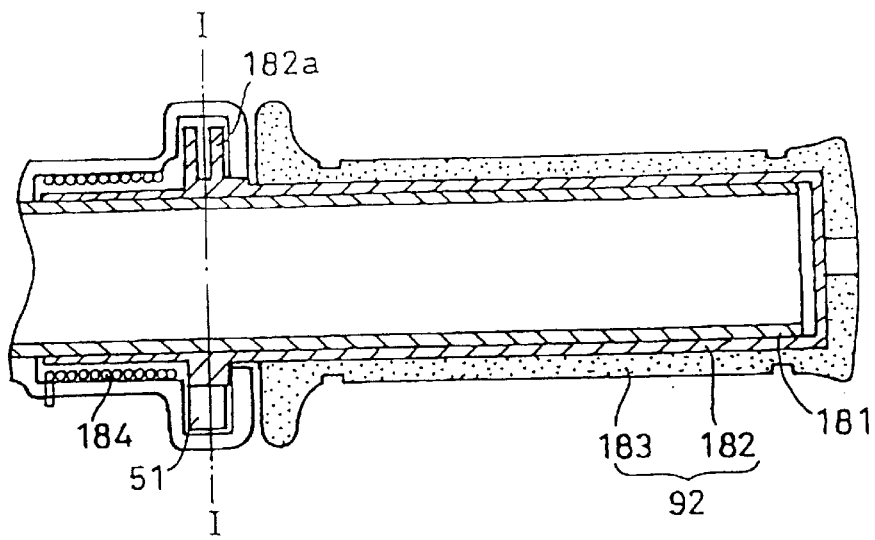
FIGS. 3(a) and 3(b) are sectional views of a throttle grip.
Figure 3B:
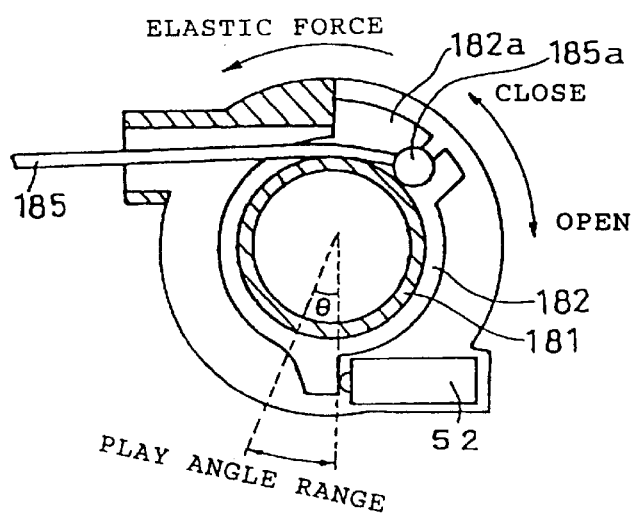

FIG. 3(a) is a sectional view showing a main portion of the throttle grip 92, and FIG. 3(b) is a sectional view taken on line I—I of FIG. 3(a). As shown in FIG. 3(a), a throttle grip main body 182 is turnably inserted around a handle pipe 181, and the outer periphery of the throttle grip main body 182 is covered with a grip cover 183. The throttle grip main body 182 has a circumferential flange 182a, and as shown in FIG. 3(b), one end 185a of a throttle wire 185 is locked with the flange 182a. The throttle grip main body 182 is usually biased by the elastic force of a spring 184 in the direction of closing an accelerator.

When the throttle grip main body 182 is twisted by the driver in the direction of opening the accelerator against the elastic force of the spring 184, the throttle wire 185 is wound in to open the throttle. With respect to the turning motion of the throttle, play is given as an idle turning motion. Accordingly, when the turning motion of the throttle grip 92 exceeds the range of the play, the throttle is opened.

A projection 51 is formed on the flange 182a, and a throttle switch 52 is provided so as to be turned on/off when the projection 51 goes away from or comes in contact with the throttle switch 52. When the throttle grip main body 182 is opened from the position shown in FIG. 3(b) by a specific angle within a play angle range θ, the throttle switch 52 closes the contact, that is, it is turned on. To be more specific, when the flange 182a is rotated by the specific angle within the play angle range θ in the direction of opening the throttle, the throttle switch 52 is turned on to start the starter, and when the flange 182a is further rotated to an extent that the rotating angle exceeds the play angle range θ, the throttle is actually opened.

The driver can maintain the vehicle stopped state while rotating the engine, by fixing the throttle grip 92 at a position where the turning angle thereof exceeds the play angle range θ. The above configuration of the throttle switch 52 is for illustrative purposes only, and therefore, the present invention is not limited thereto. For example, the throttle switch 52 may be configured to be turned on concurrently with or after the throttle is actually opened.

A throttle spring (not shown) is provided. This has an effect on the throttle in the direction of closing the throttle. To be more specific, the throttle spring is biased in the direction where the throttle grip is 14 closed. Accordingly, since the repulsive force of the throttle spring acts even within the play angle range θ, the throttle switch 52 is automatically closed even within the play angle range θ in which there is no return force of the throttle wire 185.

The throttle switch 52 may be replaced with a throttle opening sensor. In this case, a throttle full-close position decided by the throttle opening sensor corresponds to the turn-off state of the throttle switch 52, and positions other than the throttle full-close position decided by the throttle opening sensor corresponds to the turn-on state of the throttle switch 52. The use of the throttle opening sensor in place of the throttle sensor 52 makes it possible to accurately perform charging control to be described later.

Figure 5:
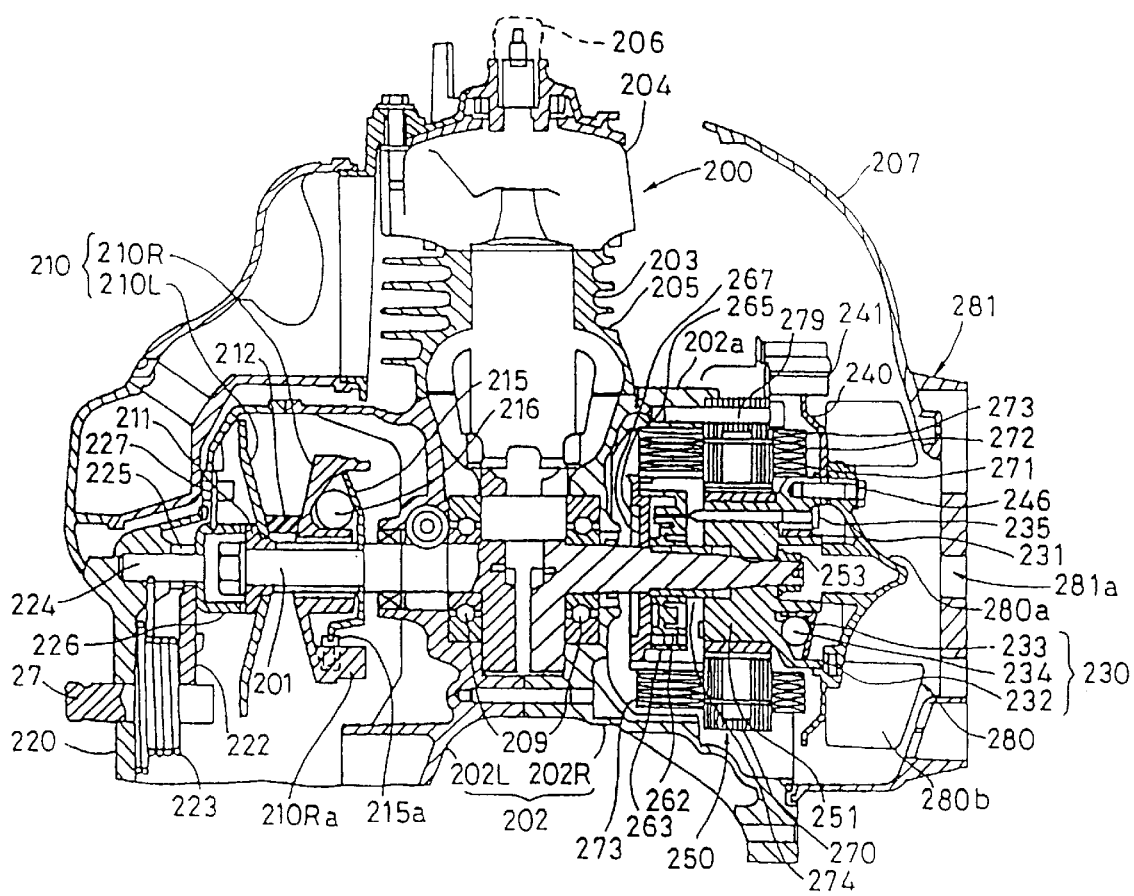
FIG. 5 is a sectional view taken on line II—II in FIG. 1.

FIG. 5 is a sectional view taken on line II—II of the internal combustion engine 200 shown in FIG. 1. The internal combustion engine 200 is configured such that a cylinder block 203 and a cylinder head 204 are sequentially assembled to a crank case 202 divided into right and left crank cases 202R and 202L. A crank shaft 201 extending from right to left in the horizontal direction is rotatably supported by the right and left crank cases 202R and 202L. The cylinder block 203 has an exhaust passage (not shown) and scavenging passages 205 extending from scavenging ports opened in a cylinder bore, to be thus communicated to a crank chamber of the crank case 202.

An ignition plug 206 facing to a combustion chamber is inserted in the cylinder head 204. The cylinder head 204 and the cylinder block 203 are covered with a fan shroud 207 except for the exposed portion of the ignition plug 206. The left crank case 202L serves as a belt-type continuously variable transmission case, and a belt drive pulley 210 is provided on the crank shaft 201 passing through the left crank case 202L so as to be rotatable with the crank shaft 201.

The belt drive pulley 210 is composed of a fixed side pulley half 210L and a movable side pulley half 210R. The fixed side pulley half 210L is fixed at a left end portion of the crank shaft 201 via a boss 211, and the movable side pulley half 210R positioned on the right side of the fixed pulley half 210L is spline-connected to the crank shaft 201. The movable side pulley half 210R is movable close to or apart from the fixed side pulley half 210L. A V-belt 212 is wound between both the pulley halves 210L and 210R.

A cam plate 215 is positioned on the right side of the movable side pulley half 210R and is fixed on the crank shaft 201. A slide piece 215a provided on the outer peripheral edge of the cam plate 215 is slidably engaged with a cam plate sliding boss 210Ra which is formed at the outer peripheral edge of the movable side pulley half 210R so as to extend outwardly therefrom in the axial direction. The outer peripheral side of the cam plate 215 of the movable side pulley half 210R has a taper plane tilted on the cam plate 215 side, and a dry weight ball 216 is contained in a space between the taper plane and the movable pulley half 210R.

As the rotational speed of the crank shaft 201 is increased, the dry weight ball 216 between the movable side pulley half 210R and the cam plate 215 is rotated therewith to be thus moved in the centrifugal direction by a centrifugal force applied thereto, whereby the movable side pulley half 210R is pushed by the dry weight ball 216 to be moved left toward the fixed side pulley 17 half 210L. The V-belt 212 held between both the pulley halves 210L and 210R is thus moved in the centrifugal direction. This results in an increase in winding radius of the V-belt 212.

A driven pulley (not shown) corresponding to the belt drive pulley 210 is provided on the rear portion of the vehicle. The V-belt 212 is also wound around the driven pulley. The power of the internal combustion engine 200 is automatically adjusted and is transmitted to a centrifugal clutch by the belt-transmission mechanism, to be used for driving the rear wheel 21 via the reduction mechanism 38 and the like.

A transmission case cover 220 extends rearwardly from the belt drive pulley 210 and covers, from left, the belt-type continuously variable transmission chamber. The kick shaft 27 is turnably supported by the front portion of the transmission case cover 220 in a state in which it passes therethrough. The kick shaft 27 is biased by a return spring 223. A drive helical gear 222 is fitted around an end portion, positioned inside the transmission case cover 220, of the kick shaft 27. A sliding shaft 224 is supported by the transmission case cover 220 so as to be coaxial with the crank shaft 201 and to be rotatable and axially slidable relative to the transmission case cover 220. A driven helical gear 225 meshing with the drive helical gear 222 is formed on the sliding shaft 224. A ratchet wheel 226 is fixed at the right end (in FIG. 5) of the sliding shaft 224. The sliding shaft 224 thus provided with the driven helical gear 225 and the ratchet wheel 226 is entirely biased left in FIG. 5 by a friction spring 227.

A ratchet to be engaged with the ratchet wheel 226 is formed on a boss 211 provided on the crank shaft 201. The ratchet wheel 226 can be brought in contact with or separated from the ratchet by sliding motion of the sliding shaft 224 relative to the transmission case cover 220. When the kick pedal 29 is actuated and the kick shaft 27 is rotated against the biasing force of the return spring 223, the drive helical gear 222 is rotated integrally with the kick shaft 27, so that the driven helical gear 225 meshing with the drive helical gear 222 is rotated integrally with the sliding shaft 224 and is slid on the boss 211 side against the biasing force of the friction spring 227. As a result, the ratchet wheel 226 is meshed with the ratchet of the boss 211, to forcibly rotate the crank shaft 201, thereby starting the internal combustion engine 200.

The right crank case 202R, formed into an approximately cylindrical shape, extends rightwardly from a main bearing 209 which rotatably supports the crank shaft 201. The crank shaft 201 projects along the center axis of the right crank case 202R. A starter/generator 250 including a starter and an AC generator combined with the starter is disposed in the cylinder body of the right crank case 202R.

An inner rotor (rotational inner magnet type rotor) 251 is fitted around a taper portion at the leading end of the crank shaft 201 and is fixed thereto by way of a nut 253. Accordingly, the inner rotor 251 is rotatable integrally with the crank shaft 201. The outer peripheral surface of the inner rotor 251 has six grooves each being formed into a circular-arc shape in cross-section. A magnet 271 made from a neodymium-iron-boron alloy is fitted in each groove of the inner rotor 251.

An outer stator 270 disposed around the outer periphery of the inner rotor 251 is supported by screwing a bolt 279 passing through the outer peripheral edge of the outer stator 270 in a cylindrical wall 202a of the crank case 202. A stator core of the outer stator 270 is composed of stacked steel thin plates, and a generating coil 272 and a starting coil 273 are wound around a plurality of teeth extending in the center direction from the stacked steel thin plates. The generating coil 272 and the starting coil 273 are wound around the teeth so as to be offset inwardly in the crank shaft direction. In other words, the amounts of the coils 272 and 273 projecting outwardly in the axial direction are made small.

The generating coil 272 and the starting coil 273 project larger axially inwardly than outwardly in the cylindrical wall 202a of the crank case 202, to form an annular shape. A commutating brush mechanism 263 is provided in an inner space formed in the above annular shape of the coils 272 and 273. A brush holder 262 allowing the crank shaft 201 to pass therethrough in the above inner space is fitted around the crank shaft 201 so that the circumferential rotation thereof relative to the crank shaft 201 is prohibited and only the axial sliding motion thereof relative to the crank shaft 201 is permitted. The brush holder 262 is biased axially inwardly by a spring 274 interposed between the inner rotor 251 and the brush holder 262.

Brushes 263 are provided at a plurality of specific locations of the inner surface of the brush holder 262 so as to be biased by a spring and to project therefrom. A commutator holder 265 is provided so as to face to the inner surface of the brush holder 262. The crank shaft 201 passes through the central portion of the commutator holder 265. The outer peripheral edge of the commutator holder 265 is fixedly supported by the portions, largely projecting inwardly in the axial direction, of the generating coil 272 and the starting coil 273.

Commutator pieces 267 are concentrically disposed at specific locations of the surface, opposed to the brush holder 262, of the commutator holder 265. The brush holder 262, which is rotatable integrally with the crank shaft 201, can be moved close to or apart from the fixed commutator holder 265. When the brush holder 262 is moved close to the commutator holder 265, the brushes 263 are brought in contact with the associated commutator pieces 267.

An inner cylindrical portion 231 and an outer cylindrical portion 232 extend axially outwardly from the outer end of the inner rotor 251 in the crank shaft direction. The inner cylindrical portion 231 covers the surrounding of the nut 253 screwed in the leading end of the crank shaft 201, and the outer cylindrical portion 232 coaxially covers the outer side of the inner cylindrical portion 231. A governor mechanism 230 is provided between the inner cylindrical portion 231 and the outer cylindrical portion 232. To be more specific, the inner peripheral surface of the outer cylindrical portion 232 is tapered, and such a taper portion is taken as a governor outer; a governor inner 233 is axially slidably fitted to the outer periphery of the inner cylindrical portion 231; and a governor weight ball 234 is interposed between the governor inner 233 and the outer cylindrical portion 232.

A connecting shaft 235 with its one end fixed to the axially slidable governor inner 233 of the governor mechanism 230 passes through the inner rotor 251 in parallel to the crank shaft 201, and the leading end of the connecting shaft 235 is fitted to the brushed holder 262. The connecting shaft 235, which connects the governor inner 233 to the brush holder 262, is movable together with the governor inner 233 and the brush holder 262 in the crank shaft direction.

When the crank shaft 201 is stopped, the brush holder 262 is biased axially inwardly by the biasing force of the spring 223 so that the brushes 263 are in contact with the commutator pieces 267. Accordingly, in this state, a current supplied from the battery flows in the starting coil 273 via the contact portions of the brushes 263 with the commutator pieces 267, to create a rotational torque of the inner rotor 251. As a result, the crank shaft 201 is rotated by such a rotational torque of the inner rotor 251, to thereby start the internal combustion engine 200.

As the rotation rate of the engine is increased, the ball 234 is moved toward the outer periphery along the tapered inner surface of the outer cylindrical portion 232, so that the governor inner 233 is slid axially outwardly and the brush holder 262 is moved axially outwardly together with the governor inner 233 via the connecting shaft 235. As a result, when the rotation rate of the engine exceeds a specific value, the brushes 263 are automatically moved apart from the commutator pieces 267. After that, the battery is charged by the generating coil 272.

An annular plate like rotor 240 for detecting a crank angle is provided on the edge portion of the outer cylindrical portion 232 constituting part of the governor mechanism 230 so that the inner peripheral edge of the rotor 240 is integrally fitted thereto. A pulser 241 is disposed at a specific position near the outer peripheral edge of the rotor 240. Repeated notches formed in the outer peripheral edge of the rotor 240 rotated together with the crank shaft 201 via the inner rotor 251 are detected by the pulser 241, to thereby decide the crank angle. The annular plate like rotor 240 covers the outer sides of the generating coil 272 and the starting coil 273 of the outer stator 270. A fan member 280 for forcibly air-cooling the internal combustion engine is integrally provided on the rotor 40 so as to project axially outwardly therefrom.

The fan member 280 is configured such that the skirt portion of a central cone portion 280a is fixed to the outer cylindrical portion 232 of the inner rotor 251 with a bolt 246 and a fan 280b provided on the outer periphery of the skirt portion is erected outside the rotor 240. The fan member 280 is covered with a fan cover 281.

The starter/generator for a vehicle in this embodiment, having the above-described configuration, exhibits the following effects. Since the commutator brush mechanism 263 is disposed axially inwardly of the inner rotor 251 and the governor mechanism 230 separated from the commutator brush mechanism 263 is disposed axially outwardly of the inner rotor 251, the amounts of components extending outwardly in the crank shaft direction can be made small.

Since the generating coil 272 and the starting coil 273 are wound around the teeth of the stator core of the outer stator 270 so as to be offset inwardly than outwardly in the axial direction, the amounts of the coils 272 and 273 projecting outwardly in the axial direction are made small. As a result, it is possible to suppress the axially outwardly swelled amounts of the rotor 240 and the fan member 280 located outside the coils 272 and 273, and hence minimize the amounts of the components swelled outwardly in the crank shaft direction.

Outside air, which is introduced in the fan cover 281 through an outside air inlet 281a formed in the fan cover 281 by rotation of the fan 280b, is spread toward the outer peripheral side along the central cone portion 280a. However, the outside air thus spread toward the outer peripheral side is cut off by the rotor 240, and thereby permeates on the starter/generator 250 side. The outside air thus hardly permeates in the commutator brush mechanism 263 located more deeply than or axially inwardly from the starter/generator 250. The result is that the commutator brush mechanism 263 is prevented from being affected by dust contained in the outside air.

Figure 4:
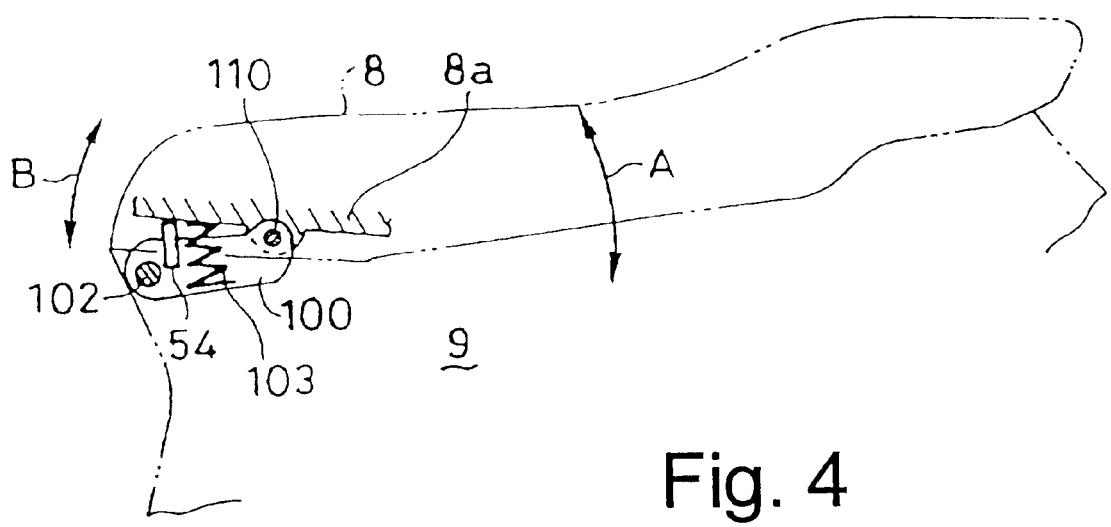
FIG. 4 is a view of the outline of a seating state detecting unit.

FIG. 4 is a view of the hinge portion for opening/closing the seat 8. The configurations of a hinge portion for opening/closing the seat 8 and a seating switch disposed near the hinge portion will be described below. The seat 8 serving as a lid of the luggage box 9 provided under the seat 8 is provided so as to be openable/closable in the direction shown by an arrow A relative to the luggage box 9. The seat 8 can be opened/closed via a hinge shaft 102 and a link member 100 which are both provided on the luggage box 9. The link member 100 is swingable around the hinge shaft 102. The other end, opposed to the end connected to the hinge shaft 102, of the link member 100, is turnably connected to a second hinge portion 110 provided on a frame 8a of the seat 8. As a result, the seat 8 can be swung around the hinge shaft 102 in the direction shown by the arrow A and can be also swung around the second hinge shaft 110 in the direction shown by an arrow B.

A spring 103 is interposed between the link member 100 and the frame 8a for biasing the seat 8 clockwise around the second hinge shaft 110. A seating switch 54 is also provided between the link member 100 and the frame Ba. When the driver is seated on the seat 8 and the frame Ba is turned by a specific amount counterclockwise around the second hinge shaft 110, the seating switch 54 is turned on for detecting the seating state.

Figure 12A:
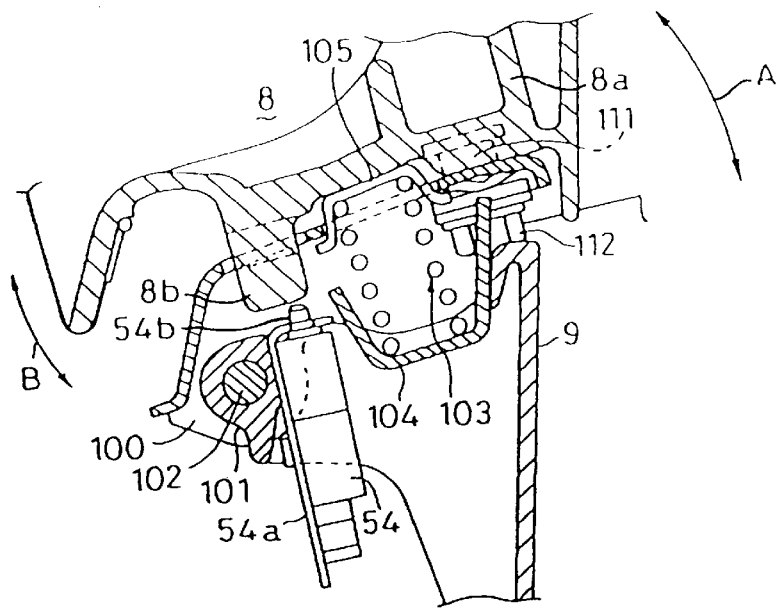
FIGS. 12(a) and 12(b) are enlarged sectional views of the seating state detecting unit at a non-seating position.
Figure 12B:
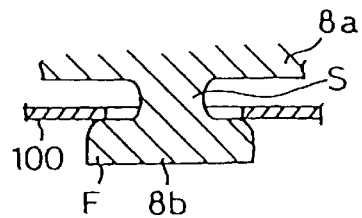

An example of the structure whose principle is shown in FIG. 4 will be described below. FIGS. 12(a) and 12(b) are enlarged sectional views of the front portion of the seat 8, illustrating a first position state in which the driver is not seated on the seat 8. Referring to FIGS. 12(a) and 12(b), a bearing 101 for supporting the link member 100 is provided to the luggage box 9. The hinge shaft 102 passes through the bearing 101, and both ends of the hinge shaft 012 pass through the link member 100 and support the link member 100. The link member 100 supported by the bearing 101 is swingable around the hinge shaft 102 in the direction shown by the arrow A.

Bolts 111, which are planted in the frame 8a of the seat 8, pass through holes (to be described later) provided in the other end portion of the link member 100 and are screwed with nuts 112. That is to say, the link member 100 is held between the nuts 112 and the underside of the frame 8a. The portion, held between the underside of the frame 8a and the nuts 112, of the link member 100 is partially bent downwardly and upwardly into two V-shapes and an inverse V-shape therebetween. The vertexes of the V-shaped portions of the link member 100 are in nearly line-contact with the nuts 112, and the vertex of the inverse V-shaped portion of the link member 100 is in nearly line-contact with the frame 8a.

The shapes of the bent portions of the link member 100 will be described in detail with reference to FIGS. 13 and 14. In this way, the frame 8a is in line-contact with the vertex of the inverse V-shaped portion of the link member 100, and the line-contact portion forms a fulcrum corresponding to the above-described second hinge shaft 110 for swingably supporting the frame 8a of the seat 8 in the direction shown by the arrow B.

The link member 100 contains a coil spring 103, and a set plate 104 is provided at one end (lower end) of the coil spring 103 and a cap 105 is provided at the other end (upper end) of the coil spring 103. The set plate 104 is supported by holes (to be described later) formed in the side surfaces of the link member 100. The cap 105 projects onto the seat 8 side from a hole formed in the upper surface of the link member 100. The projecting amount of the cap 105 is restricted by a flange portion of the cap 105. To be more specific, the cap 105 (which is elastically biased by the repulsive force of the coil spring 103) projects from the upper surface of the link member 100 by a specific amount, thereby lifting the frame 8a of the seat 8.

The frame 8a has a dowel 8b which projects in the link member 100 through another hole formed in the upper surface of the link member 100. The seating switch 54 is mounted on the luggage box 9 by way of a mounting fixture 54a, and the leading end of a spindle 54b (functioning as an actuator displaced in the seating switch 54) faces to the dowel 8b.

The dowel 8b has, as shown in FIG. 12(b), a shaft portion S and an overhang portion F. The upper end surface of the overhang portion F is engaged with the underside of the link member 100, to thereby restrict the upwardly swing motion of the seat 8 in the direction shown by the arrow B.

Figure 13:
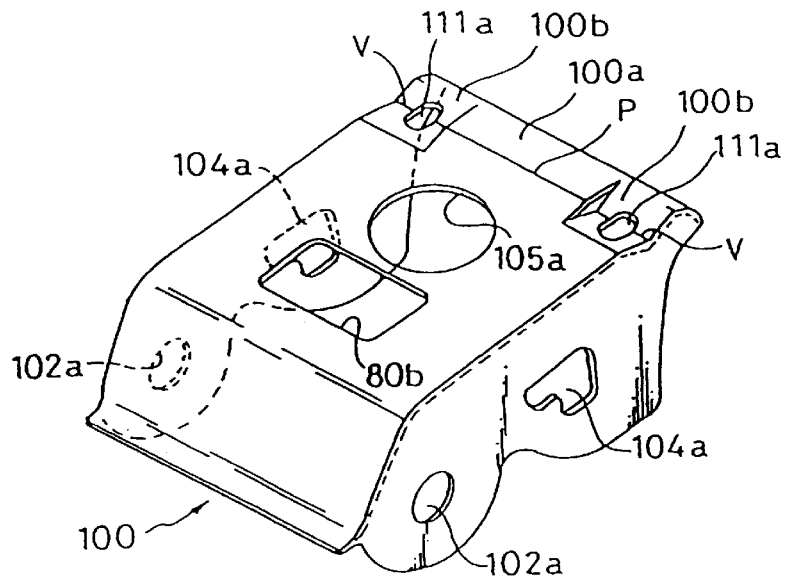
FIG. 13 is a perspective view of a link member contained in the seating state detecting unit.

FIG. 13 is a perspective view of the link member 100. Both the side surfaces of the link member 100 have holes 102a for supporting both the ends of the hinge shaft 102 and holes 104a for supporting both the ends of the set plate 104. The upper surface of the link member 100 has an approximately rectangular hole 80b allowing the dowel 8b to pass therethrough, and a round hole 105a allowing the top of the cap 105 to pass therethrough. Further, a central portion 100a of the link member 100 is upwardly bent into an inverse V-shape, and both end portions 100b of the link member 100 are downwardly bent into V-shapes. The inverse V-shaped portion 100a and the V-shaped portions 100b form a fulcrum corresponding to the above-described second hinge shaft 110.

The vertex or ridge P of the inverse V-shaped portion 100a comes into contact with the underside of the frame 8a, and the vertexes formed on the back faces of the V-shaped portions 100b (located on the back faces of the valley portions V) come into contact with the nuts 112. In addition, the nuts 112 are preferably brought into contact with the vertexes of the V-shaped portions 100b via cushioning rubber washers. The V-shaped portions 100b have holes 111a allowing the bolts 111 to pass therethrough.

The function of the portions 100a and 100b taken as the fulcrum corresponding to the second hinge shaft 110 upon swing motion of the link member 100 will be described in detail with reference to FIGS. 14 to 16.

Figure 14:
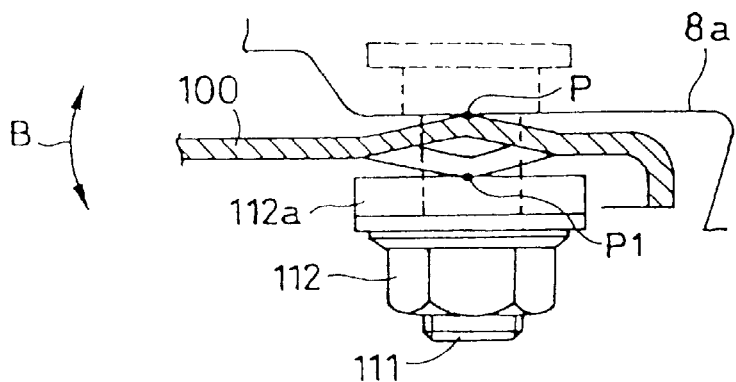
FIG. 14 is an enlarged view of a second hinge shaft.

FIG. 14 is an enlarged view of the fulcrum portion corresponding to the second hinge shaft 110. The vertex P of the inverse V-shaped portion 100a of the link member 100 is in contact with the underside of the frame 8a, and the vertex P1 of each V-shaped portion 100b (100c) is in contact with the upper surface of a rubber washer 112a interposed between the V-shaped portion 100b (100c) and the nut 112. Accordingly, the link member 100 can be brought, at the vertexes P and P1, into slide-contact with the frame 8a and the rubber washer 112a, thereby making it possible to swing the seat 8 in the direction shown by the arrow B.

With the above configuration, in the first position state in which the driver is not seated on the seat 8, the seat 8 is biased upwardly by the coil spring 103, so that the underside of the link member 100 is in contact with the overhang portion F of the dowel 8b and thereby the upward motion of the seat 8 in the direction shown by the arrow B is restricted. In such a state, since the underside of the dowel 8b is separated from the spindle 54b of the seating switch 54, the seating switch 54 is turned off to detect the non-seating state.

When the driver is seated on the seat 8, the seat 8 is downwardly turned against the repulsive force of the coil spring 103, so that the underside of the dowel 8b depresses the spindle 54b of the seating switch 54, with the result that the seating switch 54 is turned on to detect the seating state.

Figure 15:
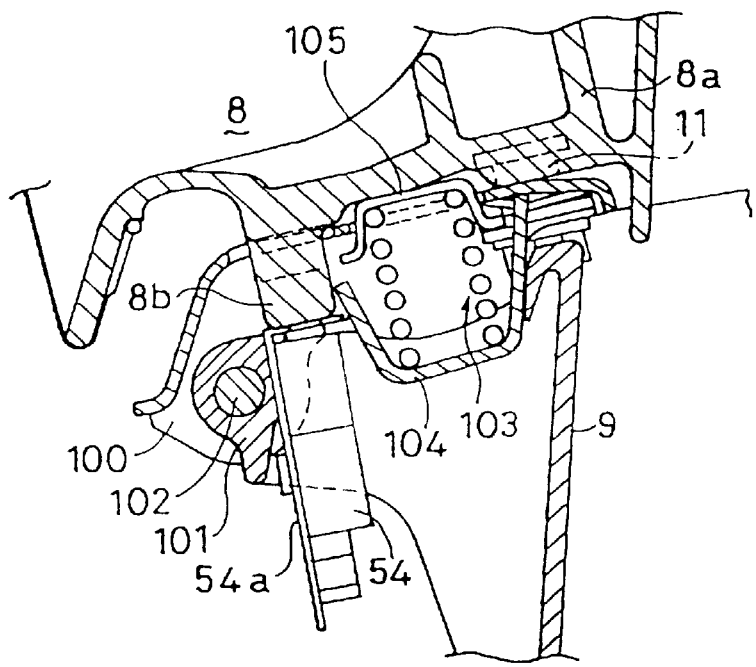
FIG. 15 is an enlarged sectional view of the seating state detecting unit at a seating position.

FIG. 15 is a view showing a second position state in which the seat 8 is downwardly turned around the fulcrum corresponding to the above-described second hinge shaft 110, so that the underside of the dowel 8b depresses the spindle 54b of the seating switch 54.

Figure 16:
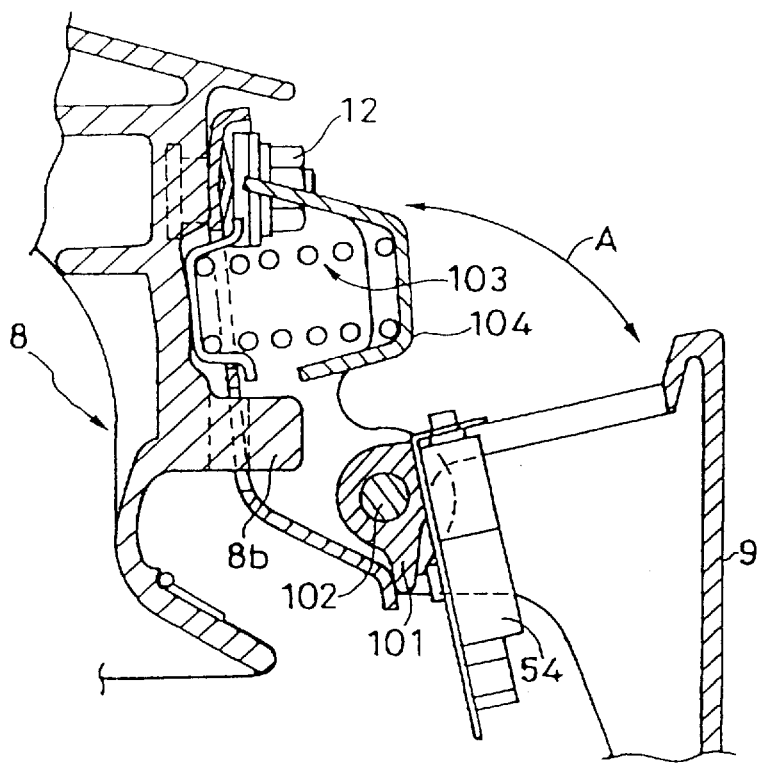
FIG. 16 is an enlarged sectional view of the seating state detecting unit at a position where a seat is raised to open a luggage box.

FIG. 16 is a view showing a state in which the seat 8 is opened for opening the luggage box 9. Even in the state in which the seat 8 is opened, the seat 8 is biased by the coil spring 103 clockwise in FIG. 16 around the second hinge shaft 110 held between the bolts 111 and the nuts 112, so that the link member 100 is pushed to the dowel 8b via the set plate 104. Accordingly, even in the state in which the seat 8 is opened, the seat 8 is rigidly fixed on the link member 100 and thereby it is kept in the stable state.

Figure 17:
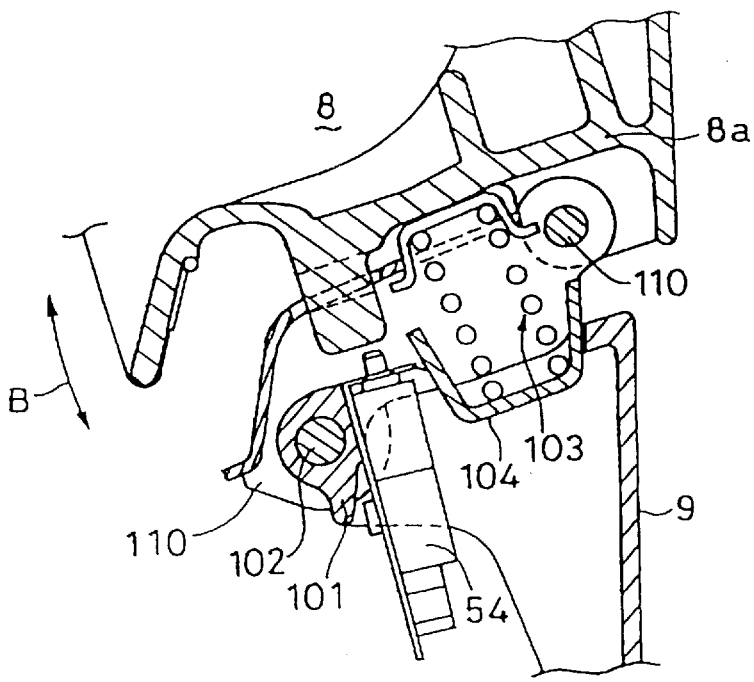
FIG. 17 is an enlarged sectional view of an example of the seating state detecting unit in which the second hinge shaft is configured as a shaft having a circular cross-section.

FIG. 17 shows a variation of the second hinge shaft 110 allowing swing motion of the seat 8 in the direction shown by the arrow B. FIG. 17 is an enlarged sectional view of a variation of the second hinge shaft 110. In this figure, the same reference numerals as those in FIGS. 12(a) and 12(b) designate the same or similar parts. In this variation, a structure in which the link member 100 is supported by the same shaft as the hinge shaft 102 is adopted in place of the fulcrum structure configured by the bolts 111, nuts 112 and the upwardly and downwardly bent portions of the link member 100. A second hinge shaft 110 is provided on the frame 8a of the seat 8 in parallel to the hinge shaft 102 for allowing the seat 8 to be swung around the second hinge shaft 110 in the direction shown by the arrow B.

Figure 18:
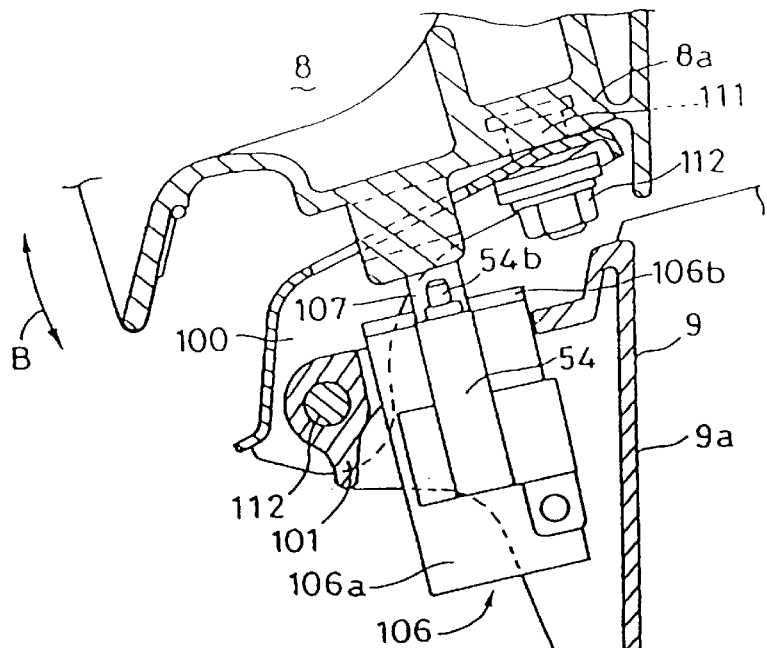
FIG. 18 is an enlarged sectional view of an example of the seating state detecting unit in which a coil spring is disposed on the vehicle side.
Figure 19A:
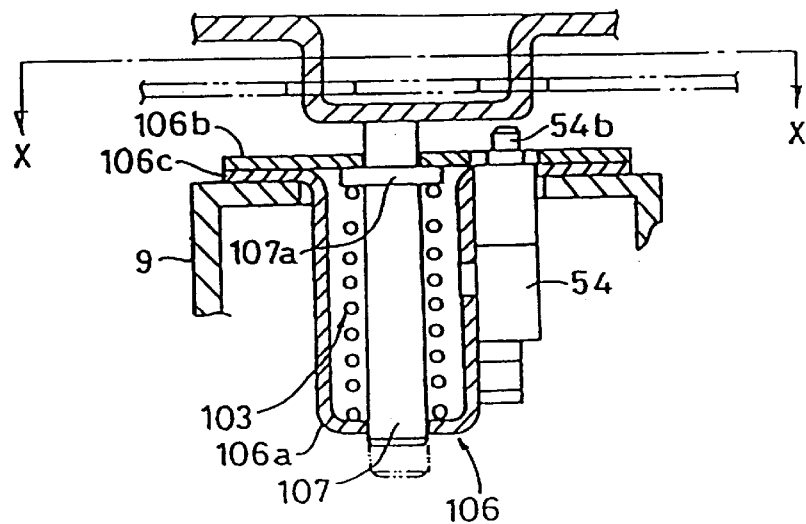
FIGS. 19(a) and 19(b) are sectional views of a link member biasing element.
Figure 19B:
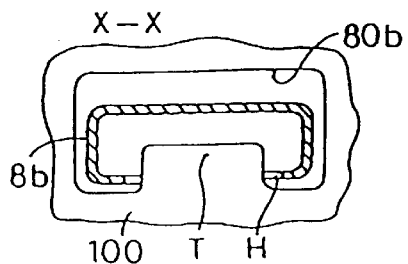

FIG. 18 shows a variation of the arrangement structure of the coil spring 103. FIG. 18 is an enlarged sectional view showing an essential portion of the variation of the arrangement structure of the coil spring 103, and FIGS. 19(a) and 19(b) are sectional views showing a spring case for containing the coil spring. In these figures, the same reference numerals as those in FIGS. 12(a) and 12(b) designate the same or similar parts. In this variation, the coil spring 103 is disposed in the luggage box 9. A spring case 106 is disposed in a space between a wall surface 9a of the luggage box 9 and the hinge shaft 102. The spring case 106 is composed of a case main body 106a for containing the coil spring 103 and a lid 106b. A flange 106c of the case main body 106a and the lid 106b are fixed to the luggage box 9 by way of a suitable fixing elements such as bolts and nuts.

A flanged plunger 107 is supported in a state in which one end thereof passes through a hole formed in the case main body 106a and the other end thereof passes through a hole formed in the lid 106b. A flange 107a is formed on a portion, on the lid 106b side, of the plunger 107. The falling off of the plunger 107 from the spring case 106 is restricted by the plunger 107a. The coil spring 103 is interposed between the bottom of the case 106a and the flange 107a. The plunger 107 is biased toward the lid 106b side by the repulsive force of the coil spring 103. The spring case 106 is positioned such that the upper end of the plunger 107 faces to the underside of the dowel 8b formed on the frame 8a of the seat 8. In other words, the seat 8 is pushed upwardly by the plunger 107 biased by the coil spring 103.

The seating switch 54 is fixed on the side surface of the spring case 106. The spindle 54b passes through holes formed in the flange 106c of the case main body 106a and the lid 106b and projects upwardly therefrom. The seating switch 54 is positioned such that the leading end of the spindle 54b is not brought into contact with the underside of the dowel 8b when the seat 8 is upwardly pushed to the uppermost position by the plunger 107.

A state in which the dowel 8b is engaged with the link member 100 is shown in FIG. 19(b) FIG. 19(b) is a sectional view taken on line X—X of FIG. 19(a) as shown in this figure, a projection T is formed at the outer edge of the hole 80b of the link member 100 and a hole H to be engaged with the projection T is formed in the front surface of the dowel 8b. Since the link member 100 is thus engaged with the dowel 8b formed on the frame 8a of the seat 8, the swing motion of the seat 8 in the direction shown by the arrow B is limited to a range in which the projection T is not brought into contact with the inner edge of the hole H.

When the driver is not seated on the seat 8, the seat 8 is pushed upwardly by the plunger 107 biased by the coil spring 103. In such a state, since the underside of the dowel 8b is separated from the spindle 54b of the seating switch 54, the seating switch 54 is turned off to detect the non-seating state.

When the driver is seated on the seat 8, the seat 8 downwardly depresses the plunger 107 against the repulsive force of the coil spring 103, so that the underside of the dowel 8b depresses the spindle 54b of the seating switch 54. As a result, the seating switch 54 is turned on to detect the seating state.

The fulcrum structure for allowing the swing motion of the seat 8 in the direction shown by the arrow B is configured by the bolts 110 and the nuts 112 is adopted in the variation shown in FIG. 18; however, the fulcrum structure may be configured by the second hinge shaft 110 described in the variation shown in FIG. 17.

Figure 20:
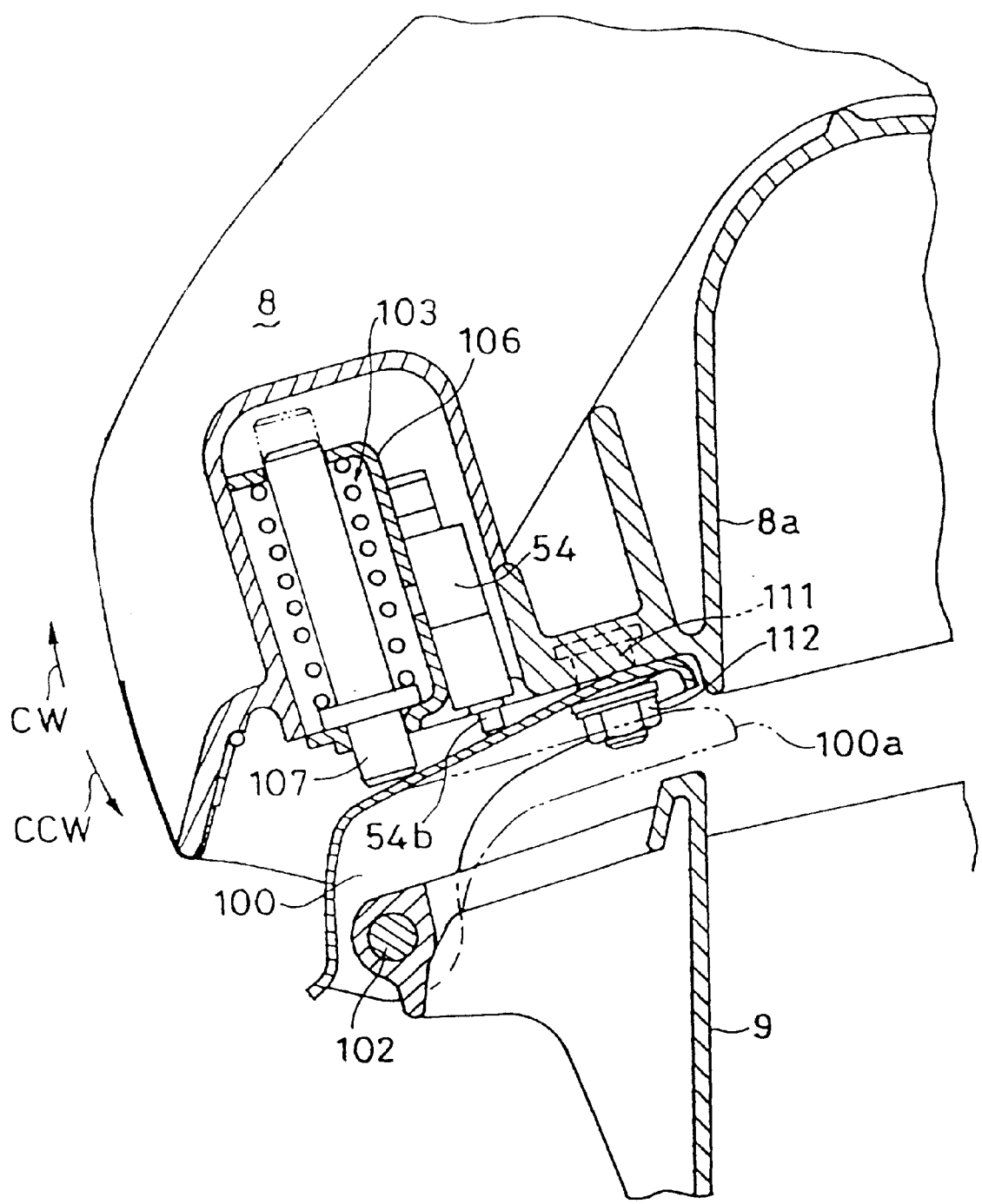
FIG. 20 is an enlarged sectional view of an example of the seating state detecting unit in which the coil spring is fixed on the seat side.

FIG. 20 shows another variation of the arrangement structure of the coil spring 103. In this variation, the coil spring 103 is disposed in the frame 8a of the seat 8. FIG. 20 is an enlarged sectional view showing a variation in which the coil spring 103 is disposed in the frame 8a of the seat 8. In this figure, the same reference numerals as those in FIGS. 12(a) and 12(b) designate the same or similar parts. The spring case 106 for containing the plunger 107 biased by the coil spring 103 is disposed in a space formed by the frame 8a of the seat 8, and is fixed to the frame 8a. The spring case 106 is positioned such that the leading end of the plunger 107 is in contact with the upper surface of the link member 100. The link member 100 is downwardly biased by the coil spring 103 via the plunger 107.

Since the plunger 107 is pushed to the link member 100 by the coil spring 103, the reaction force is applied to the plunger 107 and thereby a turning force in the direction shown by an arrow CW is applied to the seat 8. The seating switch 54, which is fixed on the side surface of the spring case 106, is positioned such that the downwardly projecting spindle 54b faces to the upper surface of the link member 100.

When the driver is not seated on the seat 8, the plunger 107 biased by the coil spring 103 is pushed to the link member 100, and the seat 8 is pushed upwardly by the reaction force applied to the plunger 107. In such a state, the seating switch 54 is positioned such that the upper surface of the link member 100 is separated from the spindle 54b of the seating switch 54, so that the seating switch 54 is turned off to detect the non-seating state.

When the driver is seated on the seat 8, the seat 8 is downwardly pushed against the repulsive force of the coil spring 103, and the plunger 107 is retreated and the seat 8 is turned in the direction shown by an arrow CCW relative to the link member 100. As the plunger 107 is retreated, the spindle 54b of the seating switch 54 is pushed upwardly by the upper surface of the link member 100. As a result, the seating switch 54 is turned on to detect the seating state.

In FIG. 20, a profile 100a of the link member 100 shown by a two-dot chain line designates the position of the link member 100 in the seating state. That is to say, in the non-seating state, the reaction force of the biased coil spring 103 is applied to the seat 8 such that the seat 8 is turned in the direction shown by the arrow CCW around the fulcrum formed by the bolts 111, the nuts 112 and the link member 100. However, since the rear portion of the seat 8 is locked, the turning of the seat 8 is restricted. The result is that the fulcrum is kept in the floating state by the reaction force of the turning motion of the seat 8. The fulcrum thus floated is descended along with the downward movement of the seat 8 caused when the driver is seated on the seat 8, and thereby the link member 100 is fixed to the position shown by the profile 100a.

The bearing for supporting the hinge shaft 102 is formed integrally with the luggage box 9 in the variation shown in FIG. 20; however, it is not necessarily integrated with the luggage box 9. For example, a bearing separated from the luggage box 9 may be fixed to the luggage box 9 with a bolt or the like.

With the above-described structure associated with the front portion of the seat and the seating switch, since the seat 8 is supported by the hinge shaft 102 passing through the circular holes provided in both the side surfaces of the luggage box 9, the seating comfort is stabilized unlike the conventional structure in which the seat 8 is supported by a hinge shaft passing through a slotted hole. Further, since the front portion of the seat 8 is floated upwardly by the link, that is, the link member 100 and the coil spring 103, the vertical stroke of the seat 8 upon seating or non-seating of the driver can be made larger, so that the operational position of the seating switch 54 can be easily set.

Figure 6:
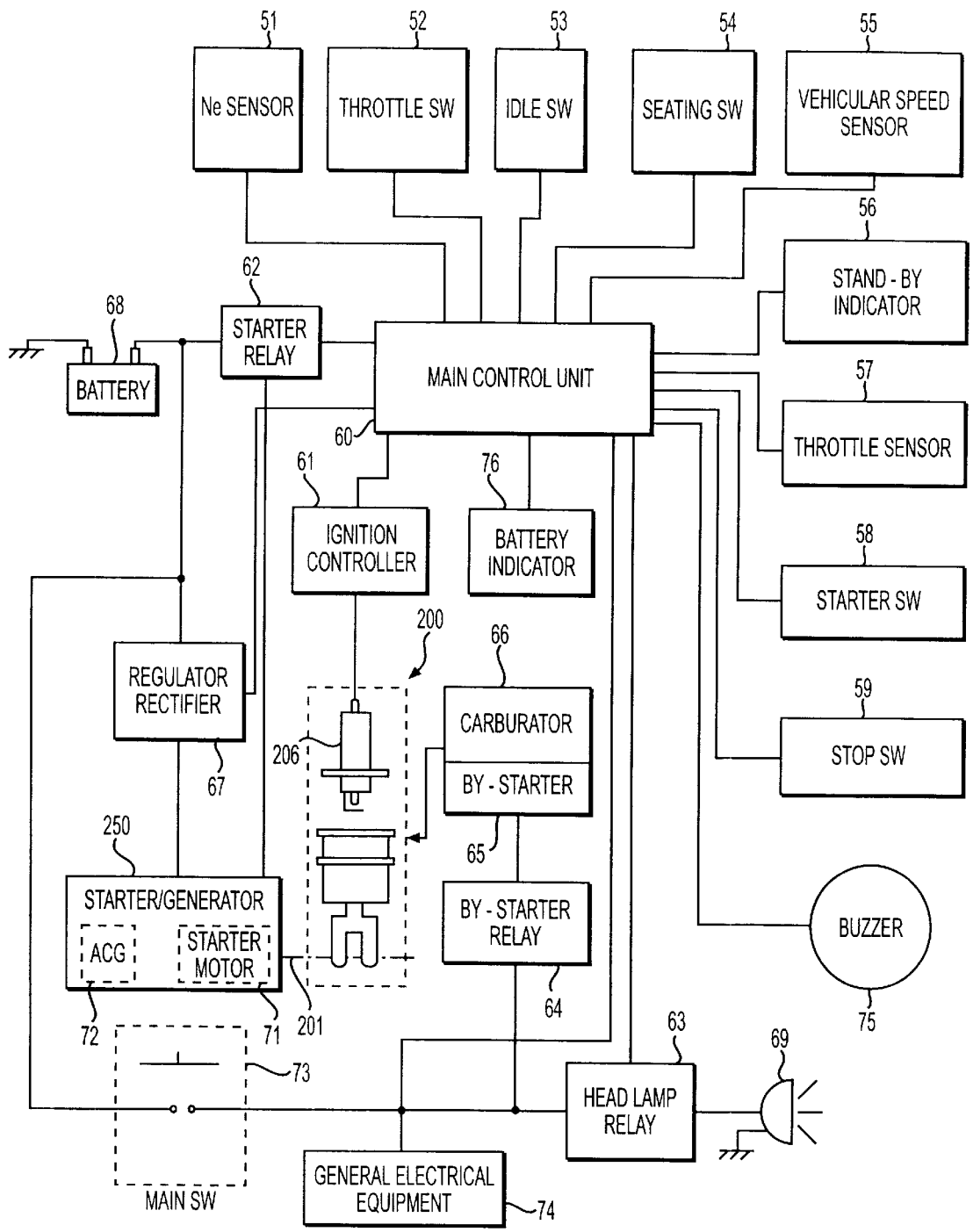
FIG. 6 is a block diagram of a starting/stopping control system according to a first embodiment of the present invention.

FIG. 6 is a block diagram showing the entire configuration of a system of controlling the starting/stopping of the internal combustion engine 200 including the starter/generator 250 for directly rotating the crank shaft 201.

An engine stopping/starting system in this embodiment includes an operational mode in which idling is restricted and another operational mode in which idling is permitted. To be more specific, the system includes an engine-stopping/vehicle-moving mode (idling restricting mode), a starting mode (idling permitting mode), and an idle switch mode.

In the engine stopping/vehicle-moving mode, when the movement of the vehicle is stopped, the engine is automatically stopped, and when the accelerator is operated in the stopped state, the engine is automatically restarted to move the vehicle.

In the starting mode, idling is temporarily permitted after the initial starting of the engine in order to perform, for example, a warming operation upon starting of the engine.

In the idle switch mode, idling is usually permitted in accordance with the intention of the driver by turning on an idle switch 53 to be described later.

The starter/generator 250 is coaxially connected to the crank shaft 201 of the engine 200. The starter/generator 250 is composed of a starter motor 71 and an AC generator (ACG) 72. The power generated by the ACG 72 is charged in a battery 68 via a regulator rectifier 67. The regulator rectifier 67 controls the voltage outputted from the starter/generator 250 at a value ranging from 12 V to 14.5 V. The battery 68 is adapted to supply, when a starter relay 62 is conducted, a drive current to the starter motor 71, and to supply a load current to various kinds of general electrical equipment 74, a main control unit 60 and the like via a main switch 73.

The main control unit 60 is connected to a Ne sensor 51, a throttle switch 52, an idle switch 53, a seating switch 54, a vehicular speed sensor 55, a standby indicator 56, a throttle sensor 57, a starter switch 58, a stop switch 59, and a battery indicator 76. The Ne sensor 51 detects an engine rotation rate Ne. The throttle switch 52 outputs a signal of an "H" level if a throttle opening O is not in the full-close state. The idle switch 53 manually permits or limits idling of the engine 200. The seating switch 54 closes the contact when the driver is seated on the seat and outputs a signal of the "H" level. The vehicular speed sensor 55 detects the vehicular speed. The stand-by indicator 56 flashes upon vehicle stop under the engine stopping/vehicle-moving mode to be described later. The throttle sensor 57 detects the throttle opening O. The starter switch 58 drives the starter motor 71 of the starter/generator 250 to start the engine 200. The stop switch 59 outputs a signal of the "H" level in response to braking operation. The battery indicator 76 lights up when the voltage of the battery 68 is reduced to a predetermined value (for example, 10 V) or less and warns the driver of the shortage of the charged amount of power in the battery 68. It should be noted that as described above, the throttle switch 52 may be omitted by making the throttle sensor 57 serve the function of the throttle switch 52.

The main control unit 60 is also connected to an ignition controller (including an ignition coil) 61, a control terminal of the starter relay 62, a control terminal of a head lamp relay 63, a control terminal of a by-starter relay 64, and a buzzer 75. The ignition controller 61 ignites an ignition plug 206 in synchronization with rotation of the crank shaft 201. The starter relay 62 supplies a power to the starter motor 71. The head lamp relay 63 supplies a power to the head lamp 69. The by-starter relay 64 supplies a power to a by-starter 65 mounted to a carburetor 66. The buzzer 75 generates buzzer sounds under a specific condition for giving a warning to the driver.

Figure 21:
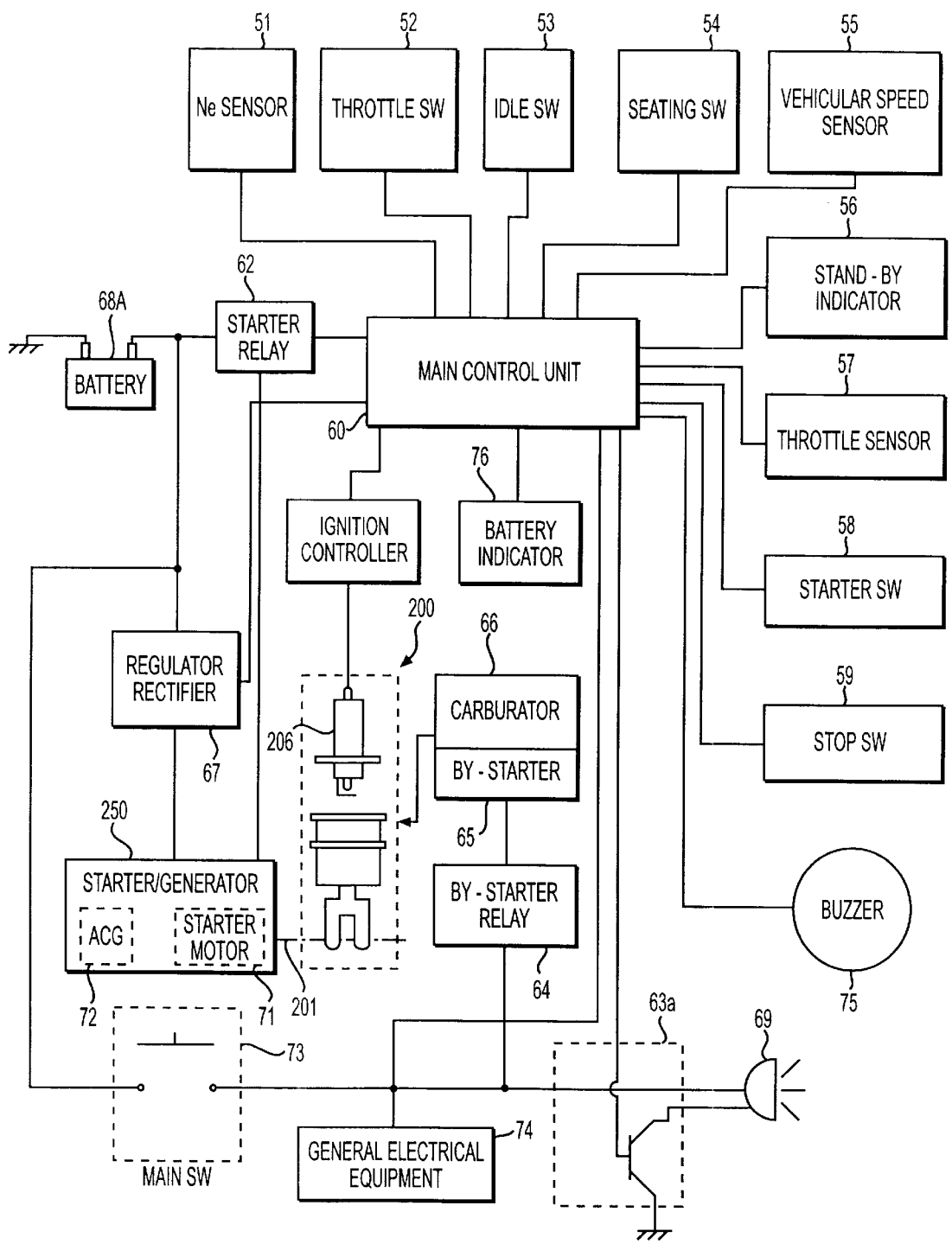
FIG. 21 is a block diagram of a variation of the starting/stopping control system shown in FIG. 6.

The control of the supply of a power to the head lamp 69 is not limited to turn-on/off of the head lamp relay 63. As shown in FIG. 21, a so called chopping control may be adopted in which switching elements 63a such as FETs are used in place of the head lamp relay 63 wherein the switching elements 63a are interrupted with a specific cycle and a specific duty ratio in place of cutoff of the power supply to thereby substantially reduce the voltage applied to the head lamp 69.

Figure 7:
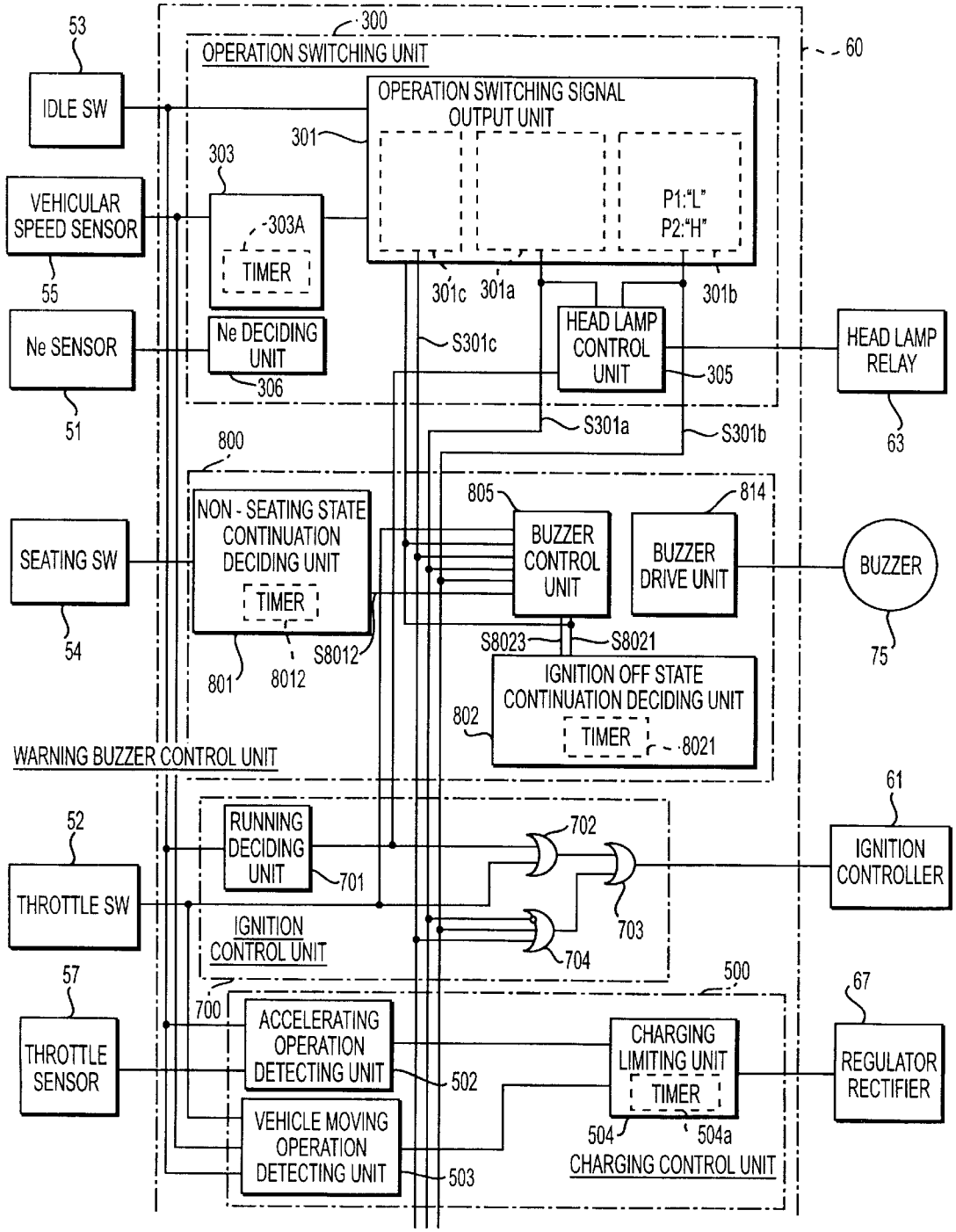
FIG. 7 is a block diagram showing the function of a main control unit.
Figure 8:
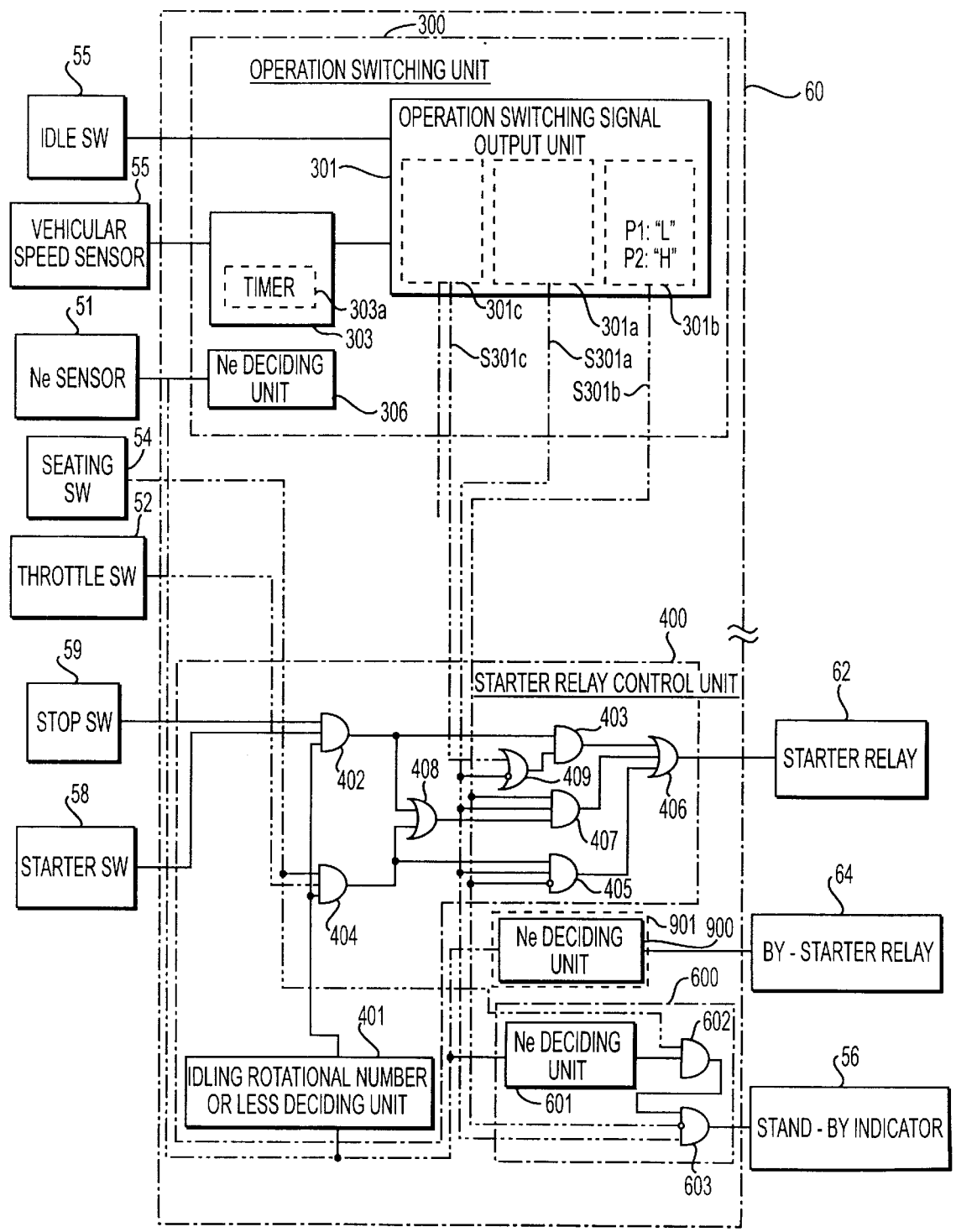
FIG. 8 is a block diagram, continued from that shown in FIG. 7, showing the function of the main control unit.
Figure 9:
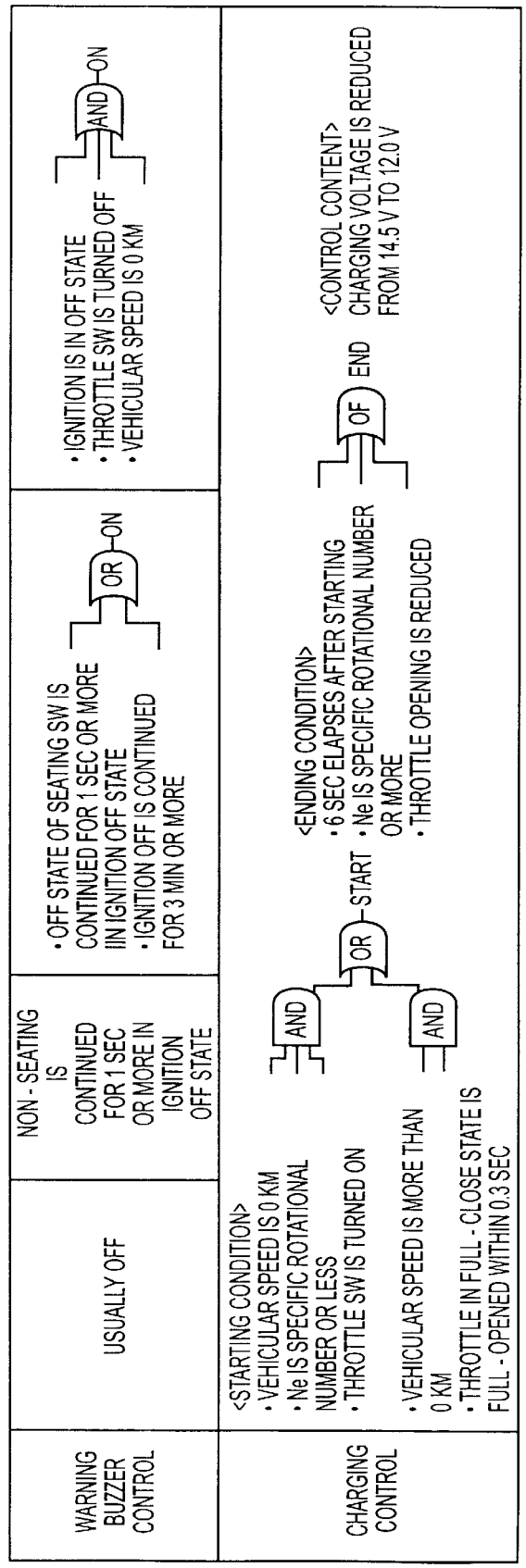
FIG. 9 is a chart of operations of the main control unit.

FIG. 7 is a block diagram showing the function of the configuration of the main control unit 60, and FIG. 8 is a block diagram continued from FIG. 7. In these figures, the same reference numerals as those described above designate the same or similar parts. FIG. 9 shows a list of control contents of a starter relay control unit 400, a by-starter control unit 900, a stand-by indicator control unit 600, an ignition control unit 700, an operation switching unit 300, a warning buzzer control unit 800, and a charging control unit 500.

The operation switching unit 300 switches, depending on the state of the idling switch 53, the state of the vehicle and the like, the operational mode of the engine starting/stopping control unit into either of the starting mode, in which idling is permitted under the specific condition, the engine-starting/vehicle-moving mode, in which the idling is restricted, and the idle switch (SW) mode, in which idling is usually permitted. The operation switching unit 300 further switches the engine-stopping/vehicle-moving mode into either a first operational pattern (hereinafter, referred to as a "first pattern") in which idling is prohibited, or a second operational pattern (hereinafter, referred to as "second pattern") in which idling is permitted under a specific condition. The second pattern of the engine stopping/vehicle-moving mode is desirable as a battery exhaustion preventive mode for when the engine is stopped for a long period of time and the head lamp is on.

In the operation switching unit 300, a signal indicating the state of the idle switch 53 is inputted in an operation switching signal output unit 301. If the operational state is in the OFF state (idling restricting state), the signal indicating the state of the idle switch 53 exhibits an "L" level. If the operational state is in the ON state (idling permitting state), the signal indicating the state of the idle switch 53 exhibits the "H" level. A vehicular speed continuously deciding unit 303 includes a timer 303a. If the vehicular speed sensor 55 detects a predetermined vehicular speed or more for a predetermined time or more, the vehicular speed continuously deciding unit 303 outputs a signal of the "H" level.

The operation switching signal output unit 301 outputs signals S301a, S301b and S301c for switching the operational mode and the operational pattern of the main control unit 60, in response to the signals outputted from the idle switch 53 and the vehicular speed continuously deciding unit 303, and further to an ignition off signal S11021 Of the "H" level if the ignition off state of the engine is continued for a specific time (3 minutes in this embodiment) or more.

Figure 10:
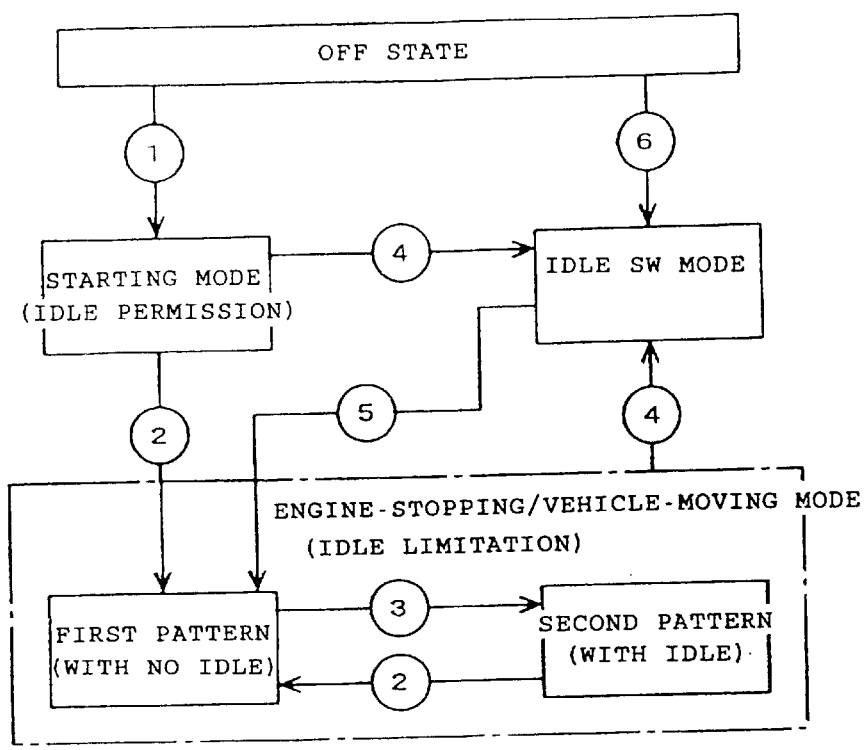
FIG. 10 is a diagram of the conditions for switching operational modes and operational patterns.

FIG. 10 is a diagram showing conditions for switching the operational mode and the operational pattern of the operation switching signal output unit 301.

In the operation switching signal output unit 301, if a condition (1) is established in which the main switch 73 is turned on and thereby the control unit 60 is reset or the idle switch 53 is turned off, the starting mode is raised by the operational mode switching unit 301a. At this time, the operational mode switching unit 301 a outputs the operational mode signal S301, of the L level.

If in the starting mode, a condition (2) is established in which the predetermined vehicular speed or more is continued for the predetermined time or more, the operational mode is changed from the starting mode into the engine-stopping/vehicle-moving mode by the operational mode switching unit 301a. At this time, the L level of the operational mode signal S301, outputted from the operational mode switching unit 301a is changed into the H level.

As described above, the engine-stopping/vehicle moving mode includes the first pattern in which idling is prohibited and the second pattern in which idling is conditionally permitted under the specific condition, and directly after the starting mode is shifted into the engine-stopping/vehicle-moving mode as described above, the first pattern in which idling is prohibited is raised by an operational pattern switching unit 301b. At this time, the operational pattern switching unit 301b outputs the operational pattern signal S311b of the L level.

If in the first pattern a condition (3) is established in which an ignition off state continuously deciding unit 802 (to be described with reference to FIG. 7) decides that the ignition off state is continued for 3 minutes or more, the operational pattern of the engine stopping/vehicle-moving mode is changed from the first pattern into the second pattern by the operational pattern switching unit 301b. At this time, the L1 level of the operational pattern signal S301b outputted from the operational pattern switching unit 301b is changed into the H level.

If the above condition (2) is established in the second pattern, the operational pattern is changed from the second pattern into the first pattern by the operational pattern switching unit 301b. At this time, the H level of the operational pattern signal S301b outputted from the operational pattern switching unit 301b is changed into the L level.

Research indicates that a driver waits from about 30 seconds to about 2 minutes at an intersection. The vehicle can be stopped for a time over the above waiting time can be caused by restriction to one-way traffic due to highway work, traffic jams, etc. Accordingly, in the operational mode/operational pattern control in this embodiment, if the engine is stopped for a long period of time (3 minutes or more in this embodiment) while the head lamp is left on during operation under the engine-stopping/vehicle moving mode, the operational pattern is changed from the first pattern into the second pattern, in which idling is permitted. Consequently, as will be described in detail later, if the starter switch 58 is turned on by the driver, the engine can be restarted, to enable the stoppage of the vehicle in the idling state, thereby preventing the battery exhaustion due to extended lighting of the head lamp 69.

If a condition (6) is established in which the main switch in the OFF state is turned on and the idle switch is turned on, the idling switch mode is raised by an idle switch mode raising unit 301C. At this time, the L level of the operational mode signal S301c outputted from the idle switch mode raising unit 301C is changed into the H level. It should be noted that in the engine stopping/vehicle-moving mode, if the idle switch 53 is turned on and the condition (4) is established, the idle switch mode is raised irrespective of the first pattern and the second pattern.

If in the idle switch mode the condition (5) is established in which the idle switch 53 is turned off, the starting mode is raised by the operational mode switching unit 301a. At this time, the operational mode switching unit 301a outputs the operational mode signal S301a Of the L level.

Referring again to FIG. 7, a signal outputted from the Ne sensor 51 is inputted into a Ne deciding unit 306 of the operational switching unit 300. If the Ne deciding unit 306 decides that the engine rotation rate is more than the predetermined value, it outputs a signal of the H level to a head lamp control unit 305. If the Ne deciding unit 306 decides once that the engine rotation rate is more than the predetermined value, it continuously outputs a signal of the H level until the main switch 73 is turned off When the head lamp relay 63 receives the signal of the H level, it allows the head lamp 69 to light up.

The head lamp control unit 305 outputs a control signal of the H level or the L level to the control terminal of the head lamp relay 63 on the basis of the operational mode (pattern) signals S301a, S301b and S301c, the signal outputted from the Ne deciding unit 306, and a signal outputted from a running deciding unit 701.

If the switching elements 63a (see FIG. 21) are adopted in place of the head lamp relay 63, the head lamp control device 305 outputs a pulse signal with a specific cycle and a specific duty ratio for chopping control of the supply of a power to the head lamp 69, in place of the output of the control signal of the L level.

In this embodiment, as shown in FIG. 9, the ON signal is usually outputted in any operational mode other than the starting mode, and in the starting mode, the ON signal is outputted if the specific engine rotation rate (1500 rpm in this embodiment) is detected by the Ne deciding unit 306 or it is decided by the running deciding unit 701 that the vehicular speed is more than 0 km.

Figure 22:
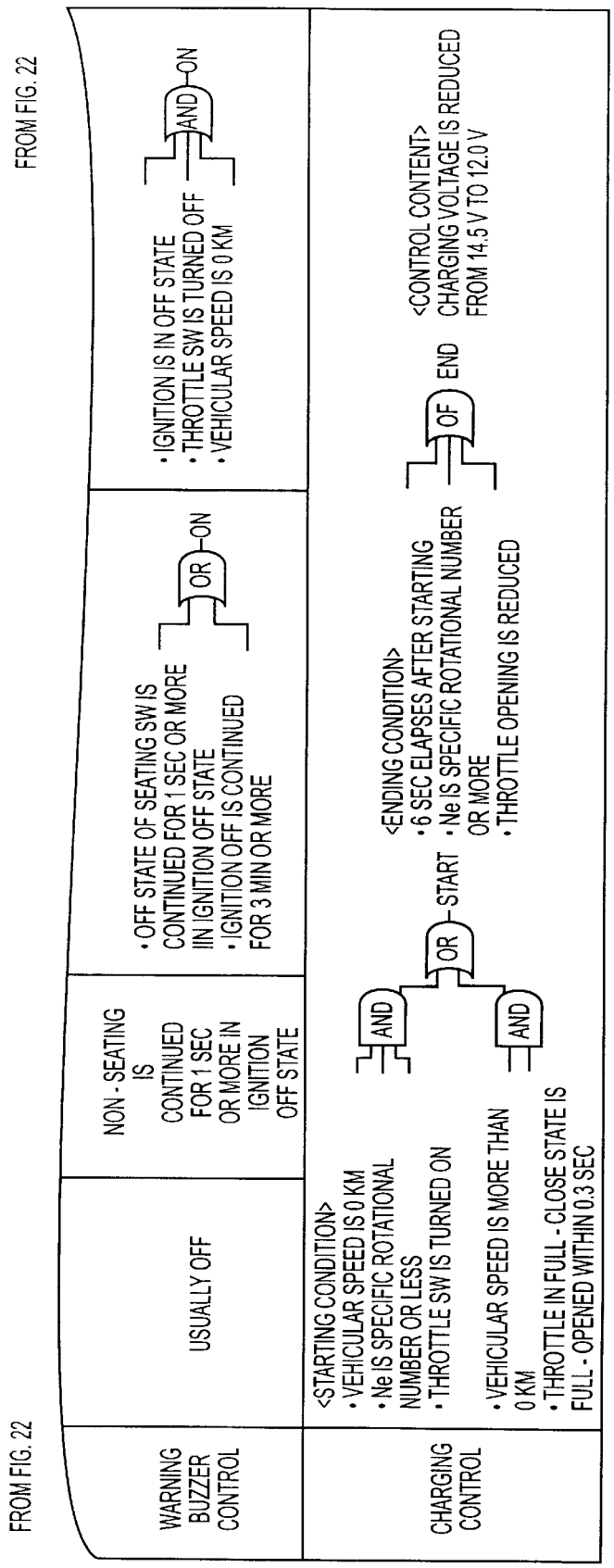
FIG. 22 is a chart of operations of a main control unit of the variation shown in FIG. 21.

If the switching elements 63a (see FIG. 21) are adopted in place of the head lamp relay 63, as shown in FIG. 22, in the first pattern of the engine stopping/vehicle-moving mode, the discharge of the battery can be suppressed at minimum by chopping control of the opening/closing of the switching elements 63a in accordance with the ignition control (to be described in detail later).

To be more specific, when the ignition control is interrupted (turned off) in response to vehicle stop and the engine is automatically stopped, the head lamp control device 305 performs chopping control of the switching elements 63a on the basis of a pulse signal with a specific cycle and a specific duty ratio so that the voltage applied to the head lamp 69 is substantially reduced from a voltage (for example, 13.1 V) in the usual ON state to a specific voltage (for example, 8.6 V) in the dimming state, to thereby dim the head lamp 69. After that, when the ignition control is restarted in response to the vehicle movement operation and the engine is restarted, the head lamp control device 305 outputs a DC signal of the H level to the switching elements 63a.

In this way, by dimming the head lamp 69 upon automatic stoppage of the engine, the discharge of the battery can be suppressed without turning the head lamp off. As a result, the amount of charging from the generator to the battery upon the subsequent vehicle movement operation can be reduced, to lower the electrical load of the generator, thereby improving the accelerating performance upon vehicle movement.

The ignition control unit 700 permits or prohibits the ignition operation by the ignition controller 61 under a specific condition for each operational mode or each operational pattern. In the ignition control unit 700, a detection signal from the vehicular speed sensor 55 is inputted in the running deciding unit 701. The running deciding unit 701 decides on the basis of the detection signal whether or not the vehicle is in the running state. If the running deciding unit 701 decides that the vehicle is in the running state, it outputs a signal of the H level.

An OR circuit 702 outputs a logic sum of the signal outputted from the running deciding unit 701 and the signal indicating the state of the throttle switch 52. An OR circuit 704 outputs a logic sum of a reversed signal of the operational mode signal S301a, the operational pattern signal S301b, and the operational mode signal S301. An OR circuit 703 outputs a logic sum of signals outputted from the OR circuits 702 and 704 to the ignition controller 61. If the signal inputted in the ignition controller 61 is at the H level, the ignition controller 61 executes the ignition operation for each timing, and if at the L level, the ignition controller 61 interrupts the ignition operation.

With this ignition control, as shown in FIG. 9, if the operational mode is either of the starting mode, the second pattern of the engine-stopping/vehicle-moving mode or the idle switch mode, the signal outputted from the OR circuit 704 exhibits the H level, so that the signal of the H level is usually outputted from the OR circuit 703. Accordingly, in the starting mode, the second pattern of the engine-stopping/ vehicle-moving model or the idle switch mode, the ignition controller 61 is usually operated.

On the contrary, in the first pattern of the engine-stopping/ vehicle-moving mode, since the signal outputted from the OR circuit 704 exhibits the L level, the ignition operation is executed under the condition that the running deciding unit 701 decides that the vehicle is in the running state, or the throttle is opened and the output from the OR circuit 702 exhibits the H level. In other words, if the vehicle is in the stopped state or the throttle is closed, the ignition operation is interrupted.

The warning buzzer control unit 800 shown in FIG. 7 generates a warning, for example, a buzzer for giving a necessary caution to the driver in accordance with the running state of the vehicle and the seating state of the driver for each operational mode or operational pattern.

A non-seating state continuation deciding unit 801 receives a signal indicating the state of the seating switch 54. The non-seating state continuation deciding unit 801 includes a timer 8012 for counting a non-seating time of the driver. If the timer 8012 times out, the non-seating state continuation deciding unit 801 outputs a non-seating state continuation signal S8012 Of the H level. The timer 8012 in this embodiment is previously set such that it times out for 1 sec.

An ignition off state continuation deciding unit 802 includes a timer 8021 for counting an ignition off time of the engine. If the ignition off state continuation deciding unit 802 detects the ignition off state, it immediately outputs an ignition-off signal S8021 of the H level and starts the timer 8021. If the timer 8021 times out, the ignition off state continuation deciding unit 802 outputs an ignition off continuation signal S8021 Of the H level. In this embodiment, the timer 8021 is set such that it times out for 3 min.

A buzzer control unit 805 determines the ON/OFF state of the buzzer 75 on the basis of the operational mode (pattern) signals S301a, S301b and S301, the non-seating continuation signal S8012, the ignition off state continuation signal S8021, the ignition off signal S1023, the signal outputted from the running deciding unit 701 and the signal outputted from the throttle switch 52. If the buzzer control unit 805 decides that the buzzer 75 is to be turned on, it outputs a signal of the H level to a buzzer drive unit 814.

Referring to FIG. 9, the operation of a buzzer control unit 805 will be described. In the starting mode, the buzzer control unit 805 usually turns off the buzzer 75. In the first pattern of the engine stopping/vehicle-moving mode, if non-seating in the ignition off state is continued for the time (1 second in this embodiment) required for time-out of the timer 8012 or more or the ignition off state is continued for the time (3 minutes in this embodiment) required for time-out of the timer 8021 or more, the buzzer control unit 805 turns on the buzzer 75.

In the second pattern of the engine stopping/vehicle-moving mode, if the ignition is in the OFF state, the throttle switch 52 is turned off and the vehicular speed decided by the running deciding unit 701 is 0 km, the buzzer control unit 805 turns on the buzzer 75. In the idle switch mode, if the ignition is in the OFF state and the non-seating state is continued for 1 second or more, the buzzer control unit 805 turns on the buzzer 75. If the signal outputted from the buzzer control unit 805 exhibits the H level, a buzzer control unit 814 outputs, to the buzzer 75, a buzzer drive signal for repeatedly actuating the buzzer 75 with the ON time of 0.2 second and the OFF time of 1.5 sec.

In this way, according to this embodiment, during operation under the engine-stopping/vehicle-moving mode, if the vehicle must be stopped (the engine must be stopped) for a long period of time (3 min or more in this embodiment) with the head lamp left as turned on due to restriction for one-way traffic for highway work or the like, the operational pattern of the engine stopping/vehicle-moving mode is changed from the first pattern into the second pattern, and simultaneously a buzzer is generated for informing the driver of permission for idling. Accordingly, only by turning on the starter switch 58 in response to the buzzer, it is possible to prevent battery exhaustion due to continuation of switch-on of the head lamp 69 for a long period of time.

In the charging control unit 500 shown in FIG. 7, an acceleration detecting unit 502 compares a signal outputted from the throttle sensor 57 with the opening/closing timing of the throttle switch 52. If the vehicular speed is more than 0 km and a time required for the throttle to be opened from the throttle full-close state to the throttle full-open is within 0.3 seconds for example, the acceleration detecting unit 502 decides such a state as the acceleration and it outputs one shot of acceleration detecting pulse.

If the throttle switch 52 is turned on under a condition with the vehicular speed of 0 km and a specific engine rotation rate (2500 rpm in this embodiment) or less, a vehicle moving operation detecting unit 503 decides such a state as the vehicle moving operation and it outputs one shot of vehicle moving operation detecting pulse. When a charging limiting unit 504 receives the above acceleration detecting pulse signal, it starts a 6 second timer 504*a*. The charging limiting unit 504 controls the regulator rectifier 67 to reduce the voltage charged in the battery from the usual value, 14.5 V to 12.0 V until the 6 second timer 504*a* times out.

With this charging control, upon rapid acceleration in which the driver rapidly opens the throttle or upon vehicle movement from the stopped state, the charging voltage is reduced, so that the electrical load of the starter/generator 250 is temporarily reduced. This makes it possible to reduce the mechanical load of the engine 200 caused by the starter/generator 250 and hence to improve the accelerating performance.

As described with reference to FIG. 21, if there is adopted the configuration in which upon automatic stoppage of the engine the switching elements 63*a* are chopping-controlled to dim the head lamp 69 thereby suppressing the discharge of the battery at minimum, it is possible to further reduce the load of the starter/generator 250, and hence to further improve the accelerating performance.

As shown in FIG. 9, if the 6second time 504*a* times out, the engine rotation rate exceeds a specific value (7000 rpm in this embodiment), or the throttle opening is reduced, the charging limiting unit 504 stops the charging control and returns the charging voltage to the usual value, 14.5 V.

Referring to FIG. 8, the starter relay control unit 400 manually or automatically starts the starter relay 62 under a specific condition in accordance with each operational mode or operational pattern. In the starter relay control unit 400, the detection signal from the Ne sensor 51 is supplied to an idling rotation rate or less deciding unit 401. If the engine rotation rate is a specific idling rotation rate (for example, 800 rpm ) or less, the idling rotation rate or less deciding unit 401 outputs a signal of the H level.

An AND circuit 402 outputs a logic product of the signal outputted from the deciding unit 401, the signal indicating the state of the stop switch 59, and the signal indicating the state of the starter switch 58. An AND circuit 404 outputs a logic product of the signal outputted from the idling rotation rate or less deciding unit 401, the signal indicating the state of the throttle switch 52 and the signal indicating the state of the seating switch 54. The OR circuit 408 outputs a logic sum of the signals outputted from the AND circuits 402 and 404.

An OR circuit 409 outputs a logic sum of the reversed signals of the operational mode signals S301, and S301*a*. An AND circuit 403 outputs a logic product of the signal outputted from the AND circuit 402 and the signal outputted from the OR circuit 409. An AND circuit 405 outputs a logic product of the signal outputted from the AND circuit 404, the operational mode signal S301*a*, and the 63 reversed signal of the operational pattern signal S311*b*. An AND circuit 407 outputs a logic product of the operational mode signal S30,*a*, the operational pattern signal S301*b*, and the signal outputted from the OR circuit 408. An OR circuit 406 outputs a logic sum of the signals outputted from the AND circuits 403, 405 and 407 to the starter relay 62.

With this starter relay control, in the starting mode and the idle switch mode, since the signal outputted from the OR circuit 409 exhibits the H level, the AND circuit 403 becomes the enable state. Accordingly, when the engine rotation rate is the idling rotation rate or less and the stop switch 59 is in the ON state (during braking operation), the starter switch 58 is turned on by the driver and thereby the signal outputted from the AND circuit 402 exhibits the H level, then the starter relay 62 is conducted to start the starter motor 71.

In the first pattern of the engine stopping/vehicle-moving mode, the AND circuit 405 becomes the enable state. Accordingly, if the throttle is opened, the engine rotation rate is the idling rotation rate or less and the seating switch 54 is in the ON state (during seating of the driver), then the signal outputted from the AND circuit 404 exhibits the H level, so that the starter relay 62 is conducted to start the starter motor 71.

In the second pattern of the engine stopping/vehicle-moving mode, the AND circuit 407 becomes the enable state. Accordingly, if either the AND circuit 402 or the AND circuit 404 exhibits the H level, the starter relay 62 is conducted to start the starter motor 71.

In the by-starter control unit 900, the signal outputted from the Ne sensor 51 is inputted in an Ne deciding unit 901. If the engine rotation rate is a specific value or more, the Ne deciding unit 901 outputs a signal of the H level to close the by-starter relay 64. With this configuration, even in any operational mode, the fuel can be made rich when the engine rotation rate is the specific value or more.

In the indicator control unit 600, the signal outputted from the Ne sensor 51 is inputted in an Ne deciding unit 601. If the engine rotation rate is the specific value or less, the Ne deciding unit 601 outputs a signal of the H level. An AND circuit 602 outputs a logic product of the signal indicating the state of the seating switch 54 and the signal outputted from the Ne deciding unit 601. An AND circuit 603 outputs a logic product of the signal outputted from the AND circuit 602, and the reversed signals of the operational mode signal S301a and the operational pattern signal S301b to the standby indicator 56.

If the signal inputted in the stand-by indicator 56 exhibits the L level, the stand-by indicator 56 is turned off, and if the inputted signal exhibits the H level, the stand-by indicator 56 flashes.

To be more specific, since the stand-by indicator 56 flashes during vehicle stop in the "engine stopping/vehicle-moving mode", the driver can recognize that insofar as the stand-by indicator 56 flashes, the vehicle can be immediately moved by actuating the accelerator even if the engine is stopped.

Figure 11:
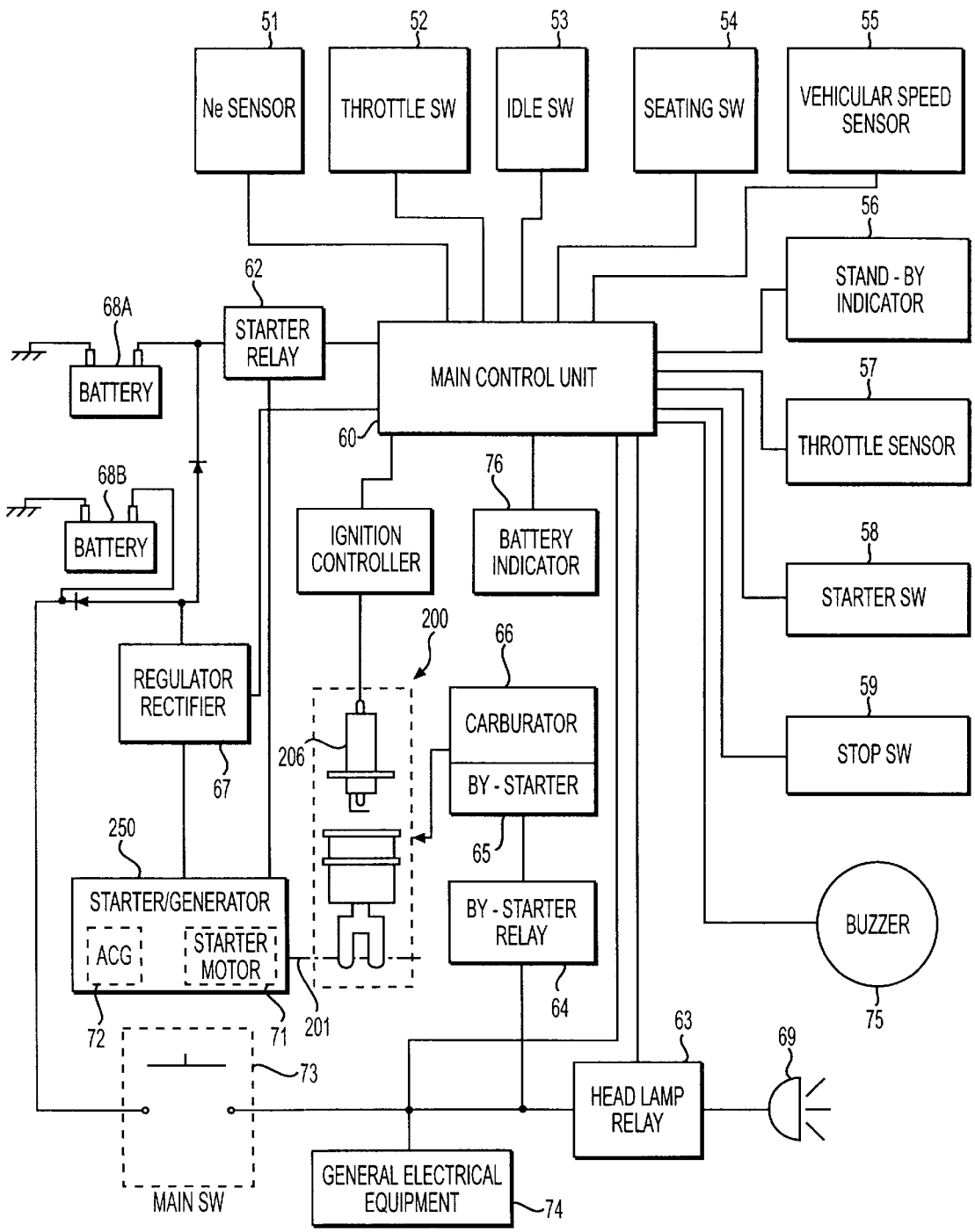
FIG. 11 is a block diagram of a starting/stopping control system according to a second embodiment of the present invention.

FIG. 11 is a block diagram showing the entire configuration of the starting/stopping control system according to another embodiment of the present invention.

In this figure, the same reference numerals as those in FIG. 6 designate the same or similar parts. In this embodiment, the power generated by the AC generator 72 is charged in two batteries 68A and 68B via the regulator rectifier 67. The battery 68A is specialized for starting the engine. When the starter relay 62 is conducted, the battery 68A supplies a drive current to the starter motor 71. The battery 68B is used for supplying a load current to various kinds of electrical equipment 74, the main control unit 60 and the like via the main switch 73.

In this way, according to this embodiment, since the battery 68A specialized for starting the engine is very small in power consumption and is usually kept in full-charged state, it usually enables desirable starting of the engine irrespective of the charged amount of the battery 68B.

The present invention exhibits the following effects:

When the vehicle moving operation is detected, the charging from the generator to the battery is limited to reduce the electrical load of the generator. Accordingly, since the torque required for the engine to drive the generator is reduced, the accelerating performance is improved. Also since the charging from the generator to the battery upon vehicle movement from vehicle stop is not interrupted but only limited, the light from the head lamp becomes dark upon vehicle movement.

The accelerating performance can be improved not only upon vehicle movement from vehicle stop, but also acceleration during running.

The charging limitation upon vehicle movement after vehicle stop or upon acceleration can be simply performed by control of a voltage of the regulator.

When the ignition control of the engine is interrupted upon vehicle stop and the engine is automatically stopped, the voltage applied to the head lamp is substantially reduced. The amount of charging from the generator to the battery can therefore be reduced. As a result, the electrical load of the generator is reduced, which improves accelerating performance upon vehicle movement. Further, by using charging control for limiting a charging voltage upon acceleration in combination with this invention, since the torque required for the engine to drive the generator can be further reduced upon vehicle movement after restarting of the engine, the accelerating performance can be further improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine stopping/starting control unit comprising:
 a generator which is adapted to be driven by a vehicle engine;
 a battery which is operatively connected to said generator to receive a charge from the generator;
 a vehicle moving operation detector for detecting when the vehicle moves from a stopped state; and
 a charging limiting device which is capable of selectively limiting charging of the battery by said generator.

2. The control unit of claim 1, wherein the charging limiting device reduces the charging of the battery by the generator in response to a signal from the vehicle moving operation detector.

3. The control unit of claim 1, wherein the engine stopping/starting control unit selectively interrupts ignition control of the vehicle engine during operation of the vehicle.

4. The control unit of claim 2, further comprising an acceleration detector, the acceleration detector detecting acceleration of the vehicle during movement of the vehicle, and said charging limiting device selectively limiting the charging from said generator into said battery in response to a signal from the acceleration detector.

5. The control unit of claim 1, further comprising a regulator which selectively controls a voltage outputted from said generator, the regulator limiting the charging of the battery by reducing the charging voltage applied to said battery.

6. The control unit of claim 1, further comprising:
 a switch for selectively controlling the supply of power to a head lamp of said vehicle; and
 a head lamp control device for selectively controlling opening/closing of said switch.

7. The control unit of claim 6, wherein when the ignition control of said engine is interrupted and said engine is stopped, said head lamp control device controls the switch to reduce the voltage applied to said head lamp.

8. The control unit of claim 6, wherein the switch includes at least one FET.

9. The control unit of claim 6, wherein the switch includes a relay.

10. A vehicle comprising:
 an engine for providing motive power to the vehicle; and
 an engine stopping/starting control unit including,
  a generator which is adapted to be driven by the vehicle engine,
  a battery which is operatively connected to said generator to receive a charge from the generator,
  a vehicle moving operation detector for detecting when the vehicle moves from a stopped state, and
  a charging limiting device which is capable of selectively limiting charging of the battery by said generator.

11. The vehicle of claim 9, wherein the vehicle in operable in the following modes:
 an idling restricting mode;
 a starting mode; and
 an idle switch mode.

12. The vehicle of claim 10, wherein when the vehicle is in the idling restricting mode, when the vehicle is stopped, the engine is automatically stopped, and when the accelerator is operated while the vehicle is stopped, the engine is automatically restarted.

13. The vehicle of claim 11, wherein when the vehicle is in the starting mode, idling is permitted after the initial start of the engine.

14. The vehicle of claim 9, wherein the charging limiting device reduces the charging of the battery by the generator in response to a signal from the vehicle moving operation detector, and wherein the engine stopping/starting control unit selectively interrupts ignition control of the vehicle engine during operation of the vehicle.

15. The vehicle of claim 9, further comprising:
   a switch for selectively controlling the supply of power to a head lamp of said vehicle; and
   a head lamp control device for selectively controlling opening/closing of said switch, the head lamp control device controlling the switch, wherein when the ignition control of said engine is interrupted and said engine is stopped, said head lamp control device controls the switch to reduce the voltage applied to said head lamp.

16. A method for controlling a vehicle electrical system comprising:
   providing an engine control unit;
   detecting a vehicle stopped state using a moving operation detector; and
   reducing the amount of charge supplied from a generator to a battery when the moving operation detector detects the stopped state.

17. The method of claim 15, further comprising reducing the voltage applied to a vehicle headlight when the moving operation detector detects a stopped state.

18. The method of claim 15, further comprising:
   providing an acceleration detector, and
   reducing the amount of charged supplied from the generator to the battery when the acceleration detector detects acceleration of the vehicle.

* * * * *